(12) United States Patent
Kasahara et al.

(10) Patent No.: US 8,531,576 B2
(45) Date of Patent: Sep. 10, 2013

(54) INFORMATION PROCESSING APPARATUS, INFORMATION PROCESSING METHOD, AND PROGRAM

(75) Inventors: Shunichi Kasahara, Kanagawa (JP); Ryo Takaoka, Tokyo (JP); Kanako Yana, Tokyo (JP); Atsushi Matsutani, Tokyo (JP); Tomoya Narita, Kanagawa (JP)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 13/012,782

(22) Filed: Jan. 24, 2011

(65) Prior Publication Data
US 2011/0221918 A1    Sep. 15, 2011

(30) Foreign Application Priority Data
Mar. 15, 2010    (JP) ................................. 2010-057817

(51) Int. Cl.
*H04N 5/222*    (2006.01)
(52) U.S. Cl.
USPC ..................................... 348/333.02; 348/370

(58) Field of Classification Search
USPC .................. 348/333.01, 333.02, 333.04, 370, 348/371
See application file for complete search history.

(56) References Cited

U.S. PATENT DOCUMENTS

| | | | |
|---|---|---|---|
| 6,606,117 B1 * | 8/2003 | Windle | 348/239 |
| 6,806,906 B1 * | 10/2004 | Soga et al. | 348/333.03 |
| 7,239,350 B2 * | 7/2007 | Ban | 348/333.02 |
| 7,317,485 B1 * | 1/2008 | Miyake et al. | 348/333.02 |
| 8,059,183 B2 * | 11/2011 | Seto | 348/333.04 |
| 8,111,315 B2 * | 2/2012 | Uchida | 348/333.02 |
| 2008/0273097 A1 * | 11/2008 | Nagashima | 348/231.99 |
| 2009/0102942 A1 * | 4/2009 | Yoshizumi et al. | 348/222.1 |
| 2009/0256933 A1 * | 10/2009 | Mizukami | 348/240.1 |
| 2011/0096137 A1 * | 4/2011 | Baker et al. | 348/14.08 |

FOREIGN PATENT DOCUMENTS
JP    2008-129120    6/2008

* cited by examiner

*Primary Examiner* — Timothy J Henn
(74) *Attorney, Agent, or Firm* — Sherr & Jiang, PLLC

(57) ABSTRACT

There is provided an information processing apparatus including an image obtaining unit for obtaining a captured image, generating unit for generating a graphic image for prompting a subject within the captured image obtained by the image obtaining unit to change a state, and an emission control unit for controlling emission of the graphic image generated by the generating unit onto the subject.

12 Claims, 21 Drawing Sheets

FRONT

REAR

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

An apparatus having the functions of both of a projector and a camera has emerged on the market recently, and there is a suggestion to use the function of the projector when a picture is taken with the camera. For example, Japanese Patent Application Laid-Open No. 2008-129120 describes a camera for projecting shooting information onto a subject, so that the subject can find the information about shooting.

SUMMARY OF THE INVENTION

However, when the camera described in Japanese Patent Application Laid-Open No. 2008-129120 is used, the subject can find information about shooting such as a range that can be taken by the camera, but the subject does not know what to do with it. Therefore, the subject himself/herself has to make a judgment from the given information.

In view of the foregoing, it is desirable to provide a novel and improved information processing apparatus, information processing method, and program capable of providing information for prompting a subject to change a state.

According to an embodiment of the present invention, there is provided an information processing apparatus including an image obtaining unit for obtaining a captured image, generating unit for generating a graphic image for prompting a subject within the captured image obtained by the image obtaining unit to change a state, and an emission control unit for controlling emission of the graphic image generated by the generating unit onto the subject.

The information processing apparatus may further including an analyzing unit for analyzing the captured image obtained by the image obtaining unit, the generating unit may generate the graphic image based on an analytic result provided by the analyzing unit.

According to an embodiment of the present invention, here is provided an information processing apparatus including an image obtaining unit for obtaining a captured image, generating unit for generating a graphic image for prompting a subject within the captured image obtained by the image obtaining unit to change a state, and an emission control unit for controlling emission of the graphic image generated by the generating unit onto the subject.

The information processing apparatus may further including an analyzing unit for analyzing the captured image obtained by the image obtaining unit, the generating unit may generate the graphic image based on an analytic result provided by the analyzing unit.

The information processing apparatus may further including an operation information obtaining unit for obtaining information about operation performed by an operator, the generating unit may generate the graphic image based on the operation information.

The generating unit may generate a corrected graphic image based on information about operation performed on the generated graphic image, and the emission control unit may control emission of the corrected graphic image onto the subject.

The analyzing unit may output the analytic result including difference information representing a difference between a desired state and a state of the subject in the captured image, and the generating unit may generate, based on the difference information, a graphic image for prompting the subject to change the state so that the subject attains a state closer to the desired state.

The emission control unit may stop emission of the graphic image when the difference information is determined to be equal to or less than a threshold value.

According to another embodiment of the present invention, there is provided an information processing method realized by causing calculation processing means of an information processing apparatus to execute a predetermined processing procedure, the processing procedure including the steps of obtaining a captured image, generating a graphic image for prompting a subject within the captured image obtained to change a state; and controlling emission of the graphic image onto the subject.

According to another embodiment of the present invention, there is provided a program for causing a computer to function as, an image obtaining unit for obtaining a captured image, a generating unit for generating a graphic image for prompting a subject within the captured image obtained by the image obtaining unit to change a state, and an emission control unit for controlling emission of the graphic image generated by the generating unit onto the subject.

As described above, according to the present invention, information for prompting a subject to change a state can be provided.

DETAILED DESCRIPTION OF THE EMBODIMENT

Figure 1:
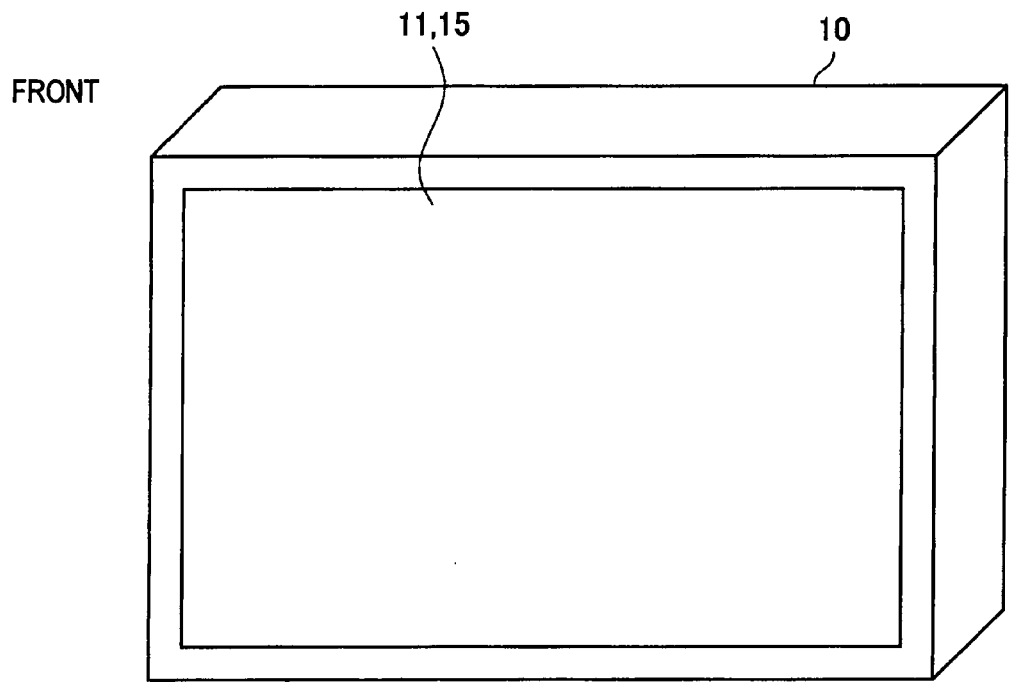
FIG. 1 is an external view illustrating an information processing apparatus according to an embodiment of the present invention.
Figure 1:
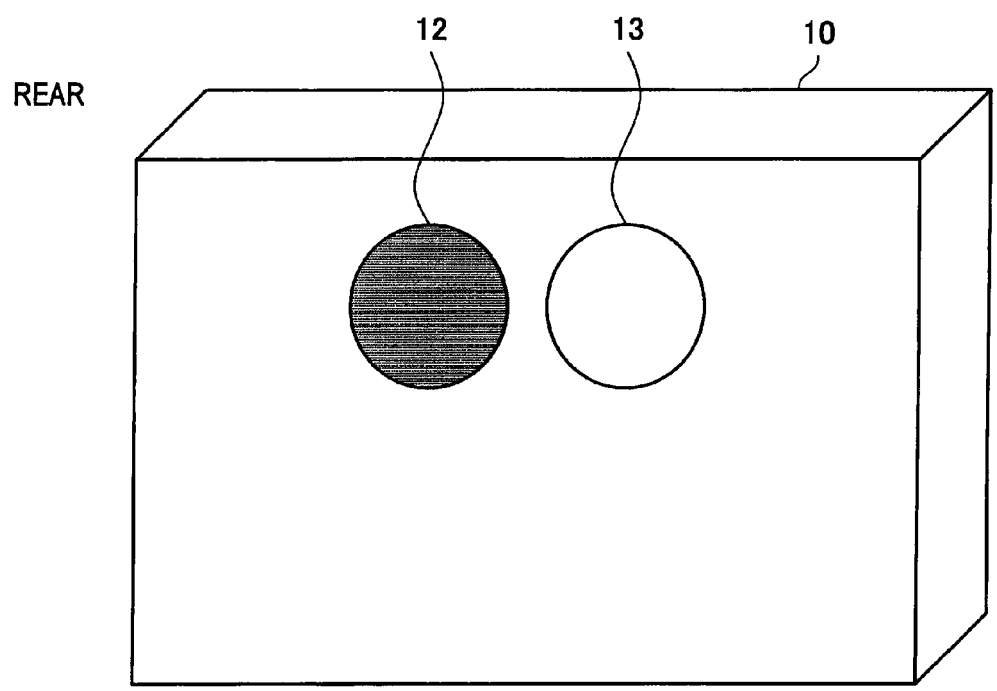

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The following explanation will be made in the order listed below.

1. Overview
2. Functional configuration
3. Operation
4. Example of generation of a graphic image according to user operation
5. Example of automatic generation of a graphic image according to an analytic result <1. Overview>

First, an overview of the present embodiment will be explained with reference to FIG. 1. The information processing apparatus 10 according to the present embodiment mainly includes an image capturing device (camera) for capturing an image of a subject, an emission device (projector) for projecting a video image onto the subject, a display device (display) for displaying the captured image taken by the camera, and the like. As shown in FIG. 1, one face (front surface) of the information processing apparatus 10 is arranged with a display 11. The other face (back surface) of the information processing apparatus 10 is arranged with a camera lens 12 and a projector lens 13. In the explanation below, the camera including the camera lens 12 is referred to as an image capturing device 12 or a camera 12. The projector including the projector lens 13 is referred to as an emission device 13 or a projector 13.

In the information processing apparatus 10, the camera 12 and the projector 13 are arranged at fixed positions of the casing of the information processing apparatus 10. The image of the subject taken by the camera 12 is displayed on the display 11. The projector 13 projects a projection image onto the subject. Then, the display 11 displays the subject onto which the projection image is projected.

Figure 2:
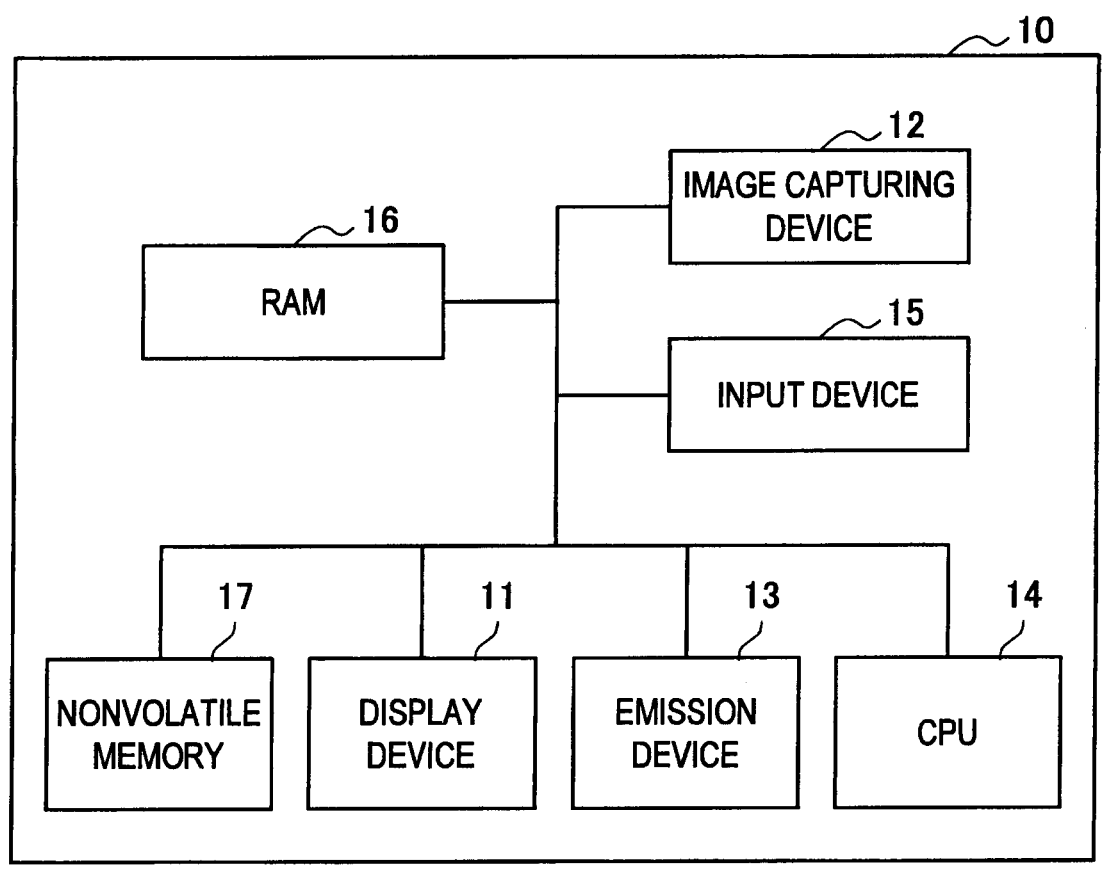
FIG. 2 is a hardware configuration diagram illustrating an information processing apparatus according to the embodiment.

Subsequently, a hardware configuration of the information processing apparatus 10 will be explained with reference to FIG. 2. FIG. 2 is a block diagram illustrating the hardware configuration of the information processing apparatus 10. As shown in FIG. 2, the information processing apparatus 10 includes a display device (display) 11, an image capturing device (camera) 12, an emission device (projector) 13, a CPU 14, an input device 15, a RAM (Random Access Memory) 16, a nonvolatile memory 17, and the like.

The CPU 14 functions as a calculation processing unit and a control device, so as to control overall operation in the information processing apparatus 10 according to various kinds of programs. The CPU 104 may be a microprocessor. The RAM 16 temporarily stores programs used during execution of the CPU 14 and parameters and the like that change as necessary during the execution. These are connected with each other by a host bus constituted by a CPU bus and the like. The nonvolatile memory 17 stores programs, calculation parameters, and the like used by the CPU 14. The nonvolatile memory 17 may be, for example, a ROM (Read Only Memory), a flash memory, and the like.

The display device 11 is an example of an output device for outputting information. The display device 11 may be, for example, a liquid crystal display (LCD) device, and an OLED (Organic Light Emitting Diode) device.

The image capturing device 12 has a function of causing a CCD to convert light obtained through an image capturing lens into an electric signal so as to convert an analog signal into a digital signal, thus capturing an image of a subject. The image taken by the image capturing device 12 is displayed on the display device 11.

The emission device 13 has a function of emitting light onto a subject through an emission lens. The emission device 13 projects a projection image onto a subject according to control of the CPU 14.

The input device 15 includes, for example, input means for a user to input information such as a touch panel, buttons, switches, and levers, and an input control circuit for generating an input signal based on user input and outputting the input signal to the CPU 14. In the explanation below, the input device 15 is referred to as a touch panel 15, because this explanation mainly relates to a case where the input device 15 is the touch panel laminated on the display device 11.

Figure 3:
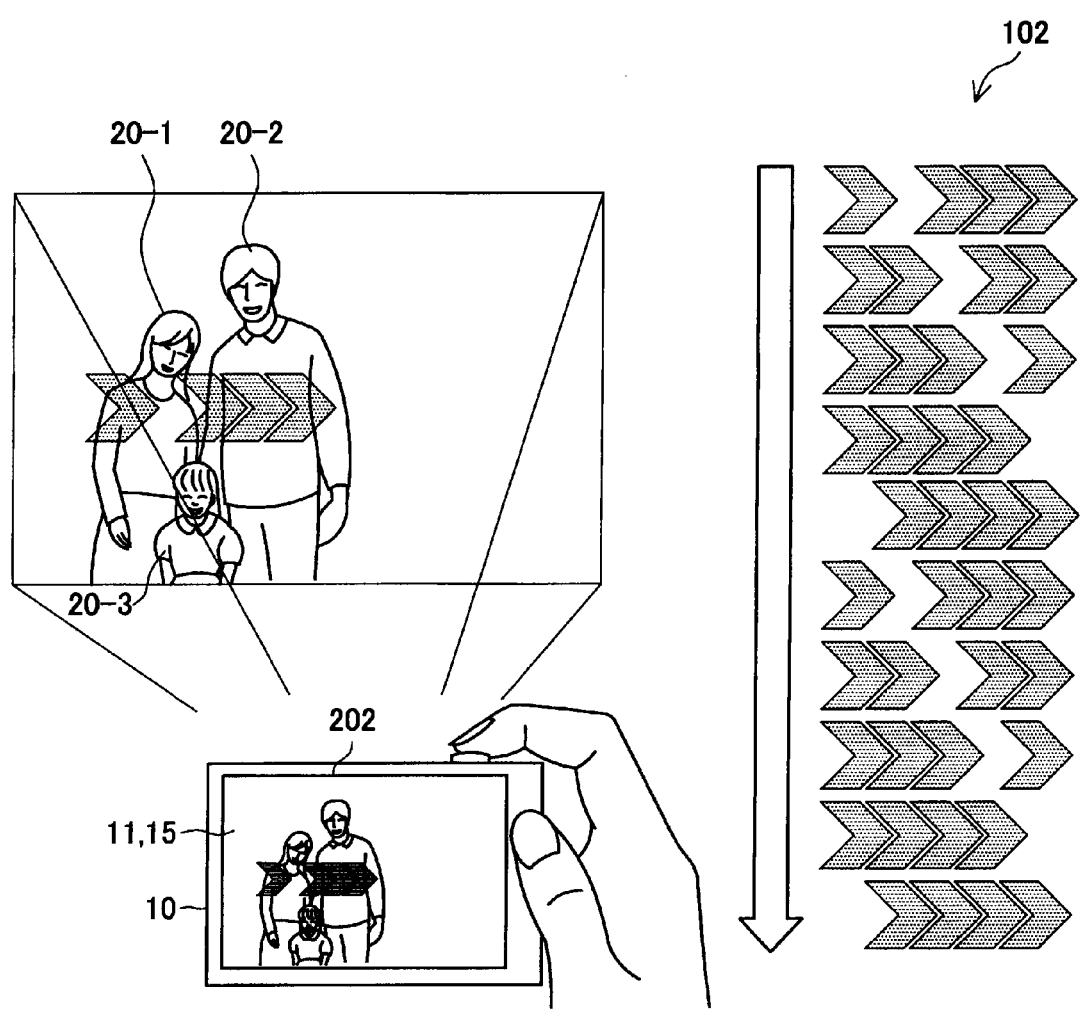
FIG. 3 is an explanatory diagram illustrating an example of user experience realized with the information processing apparatus according to the embodiment.

Subsequently, an example of user experience realized with the information processing apparatus 10 will be explained with reference to FIG. 3. FIG. 3 is an explanatory diagram illustrating an example of user experience realized with the information processing apparatus 10.

In this specification and the appended drawings, elements playing substantially the same roles may be distinguished by being denoted with different numbers suffixed to the same reference numerals with a hyphen. For example, a plurality of elements playing substantially the same roles are distinguished by being denoted with reference numerals such as a subject 20-1, a subject 20-2, and a subject 20-3, as necessary. However, when it is not necessary to particularly distinguish elements playing substantially the same roles, they are denoted with the same reference numeral. For example, when it is not necessary to particularly distinguish elements such as the subject 20-1 and the subject 20-2, each of them is simply referred to as a subject 20.

The information processing apparatus 10 generates a graphic image 102 for prompting a subject 20 to change a state of the subject in a captured image 202, i.e., an arrangement, a facial expression, a pose of the subject 20, and uses the emission device 13 to project the graphic image 102 onto the subject 20. The subject can see the graphic image 102 to find a change of state which the subject is requested to perform. Accordingly, the subject 20 changes the state, e.g., moves, changes his/her facial expression, or changes the pose, according to the graphic image 102. Thus, the state of the subject 20 can be changed to the requested state.

In this case, when the projected graphic image 102 is a dynamic graphic image that changes over time, the subject 20 can find the content of the information in a more accurate manner compared with a case where a static graphic image is used to prompt the subject 20 to change the state. For example, in the example of FIG. 3, when the subject 20 is requested to move to the right in whole, a graphic image 102 including a series of multiple small right-pointing arrows is used to prompt the subject 20 to change the state. At this occasion, the dynamic graphic image 102 is projected such that some of small arrows constituting the graphic image 102 are missing, and the position of the missing small arrows successively is changed over time in the right direction. In this case, the subject 20 can intuitively understand the direction of the arrows compared with a case where a static graphic image including static right-pointed arrows is simply projected.

The requested state may be, for example, a state requested by the operator of the information processing apparatus 10. In this case, the operator inputs information using the touch panel 15 to generate a graphic image for guiding the subject 20 to a requested state while the operator sees a captured image displayed on the display device 11. Alternatively, the requested state may be, for example, a preferable state stored in the information processing apparatus 10 in advance. For example, when the information processing apparatus 10 previously stores information about a preferable composition for a captured image, the information processing apparatus 10 analyzes the captured image, thereby generating a graphic image for prompting the subject to change to a state so that the composition becomes closer to the preferable composition. Alternatively, the preferable state previously stored in the information processing apparatus 10 is not limited to compositions, and may be facial expressions.

The overview of the information processing apparatus 10 according to the present embodiment and user experience realized with the information processing apparatus 10 has been explained hereinabove. Subsequently, a functional configuration of the information processing apparatus 10 for realizing such functions will be explained with reference to FIG. 4.

<2. Functional Configuration>

Figure 4:
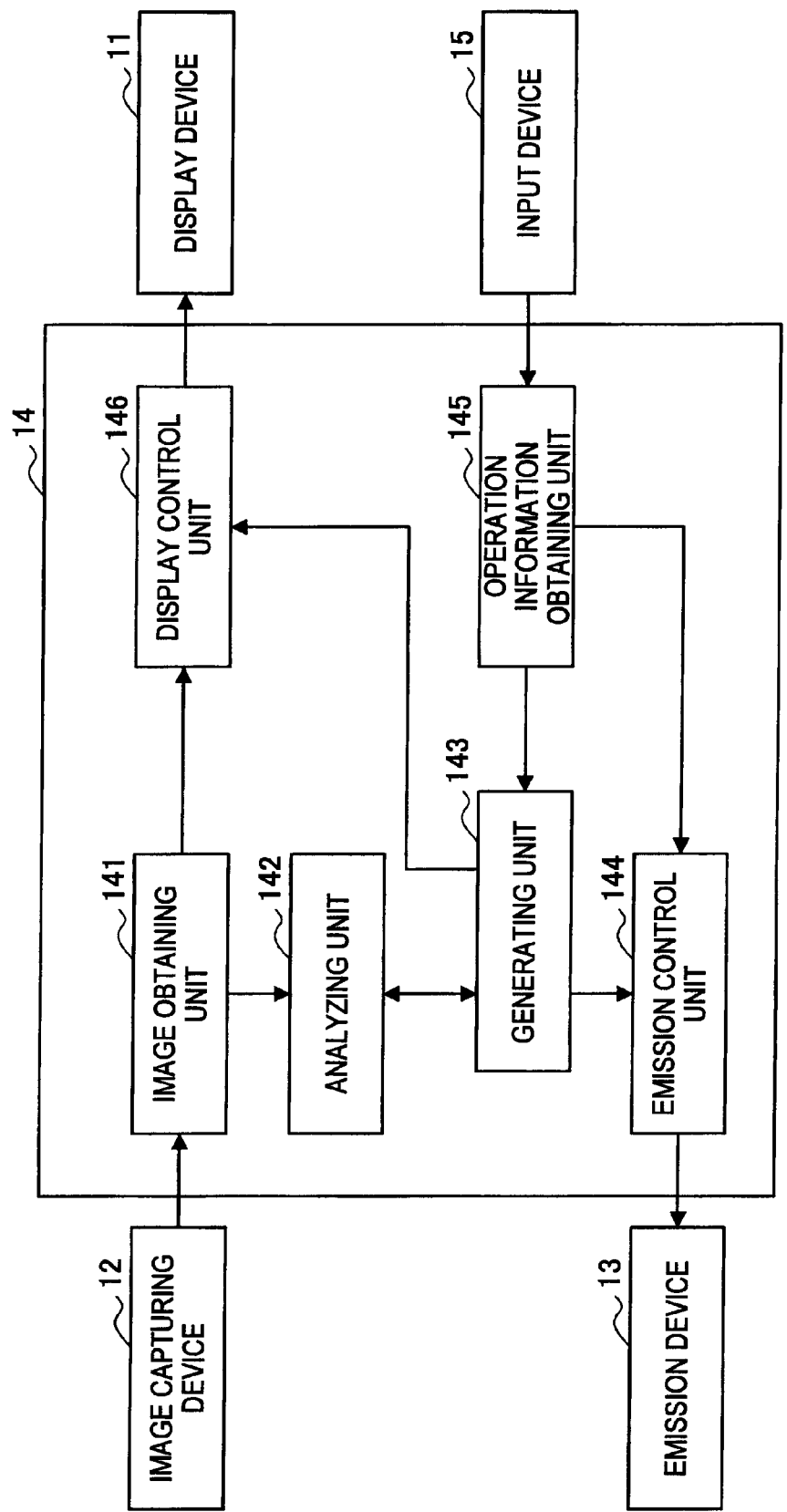
FIG. 4 is a functional block diagram illustrating the information processing apparatus according to the embodiment.

FIG. 4 is a functional block diagram illustrating the CPU 14 of the information processing apparatus 10. The CPU 14 of the information processing apparatus 10 mainly includes functions of an image obtaining unit 141, an analyzing unit 142, a generating unit 143, an emission control unit 144, an operation information obtaining unit 145, and an display control unit 146.

The image obtaining unit 141 obtains a captured image by controlling the image capturing device 12. The image obtaining unit 141 provides the captured image thus obtained to the analyzing unit 142 and the display control unit 146.

The analyzing unit 142 analyzes the captured image obtained by the image obtaining unit 141. The analyzing unit 141 performs analysis in a case where an operation mode of the information processing apparatus 10 is set to an assist mode in which information is provided to the subject using a graphic image, and in the assist mode, an automatic analysis mode for automatically generating a graphic image by analysis is further selected. When the operation mode is not the automatic analysis mode, the analyzing unit 142 provides the captured image to the generating unit 143 without executing the analysis of the captured image.

In this case, the functions of the analyzing unit 142 during operation of the automatic analysis mode will be explained. The analyzing unit 142 analyzes the captured image according to a predetermined analysis criteria, thereby outputting an analytic result to the generating unit 143. The analytic result includes information as to whether or not a state of the subject 20 in the captured image is in a preferable state according to the predetermined analysis criteria and the degree of difference between the state of the subject 20 in the captured image and the preferable state. Specific contents of analysis performed by the analyzing unit 142 will be explained later in detail using specific examples.

The generating unit 143 generates a graphic image for prompting the subject in the captured image obtained by the image obtaining unit 141 to change a state. At this occasion, the generating unit 143 generates a graphic image for prompting the subject to attain a state closer to a desired state. When the information processing apparatus 10 operates in the analytic mode, the generating unit 143 generates a graphic image based on the analytic result generated by the analyzing unit 142. When the information processing apparatus 10 operates in an input mode of the assist mode for generating a graphic image according to input of the operator, the generating unit 143 generates a graphic image based on operation information provided by the operation information obtaining unit 145. Even in the operation of the input mode, when it is necessary to have a graphic image based not only on operation information but also on the analytic result, the generating unit 143 may generate the graphic image based on both of the operation information and the analytic information upon causing the analyzing unit 142 to analyze the captured image. Specific examples in such case will be explained later. Then, the generating unit 143 provides the generated graphic image to the emission control unit 144 and the display control unit 146.

Further, the generating unit 143 may generate a corrected graphic image generated by correcting the projected graphic image based on information about operation performed on the generated graphic image. At this occasion, the information about operation may be information about operation performed by an operator, using the touch panel 15, on a graphic image displayed on the display device 11, for example. Alternatively, the information about operation may be information about operation performed by the subject on a graphic image projected onto the subject 20 by the emission device 13.

The emission control unit 144 controls the emission device 13 projecting a graphic image. The emission control unit 144 controls projection of a graphic image or a corrected graphic image onto the subject 20, which is generated by the generating unit 143. For example, when the emission control unit 144 obtains, from the operation information obtaining unit 145, information indicating that a shutter button of the image capturing device 12 is pressed down, the emission control unit 144 may stop emission of the graphic image. Alternatively, when the analytic result provided by the analyzing unit 142 indicates that the state of the subject 20 attains the requested state, the emission control unit 144 may stop emission of the graphic image.

The operation information obtaining unit 145 obtains operator's operation information about operation performed on the information processing apparatus 10. The operation information obtaining unit 145 obtains operator's operation information about operation performed with the input device 15. In this case, the input device 15 may be, for example, a touch panel. The input device 15 may be an input device such as a shutter button.

The display control unit 146 controls a screen display of the display device 11. The display control unit 146 generates a display image by placing the graphic image provided by the generating unit 143 on the captured image obtained by the image obtaining unit 141, and causes the display device 11 to display the display image.

The functional configuration of the CPU 14 of the information processing apparatus 10 has been explained hereinabove. These functions of the respective units explained hereinabove are actually achieved by causing the CPU 14 to read a control program from a storage medium such as the RAM 16 storing the control program including processing procedure for achieving these functions and analyzing and executing the program. Subsequently, operation of the information processing apparatus 10, which is performed by the respective functional units explained above, will be explained with reference to the flowchart of FIG. 5.

<3. Operation>

Figure 5:
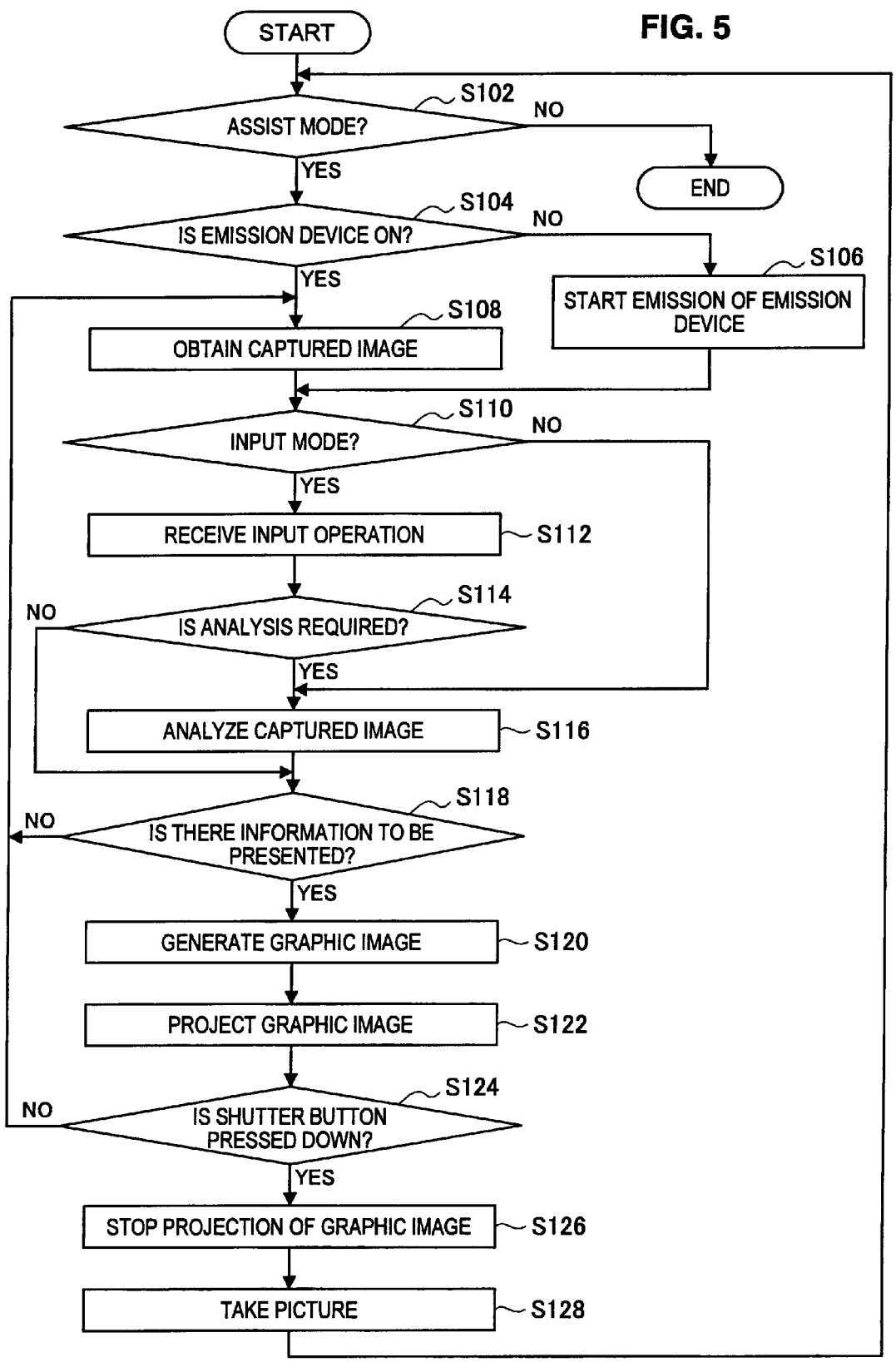
FIG. 5 is a flowchart illustrating operation of the information processing apparatus according to the embodiment.

FIG. 5 is a flowchart illustrating operation of the information processing apparatus 10 in the assist mode. First, the CPU 14 of the information processing apparatus 10 determines whether the operation mode of the information processing apparatus 10 is set to the assist mode (S102). When the operation mode is determined not to be the assist mode in the determination of step S102, the processing is terminated, since the operation explained here has nothing to do with those modes other than the assist mode. On the other hand, when the operation mode is determined to be the assist mode, the CPU 14 subsequently makes a determination as to whether the emission device 13 is operating (S104).

When the emission device 13 is determined not to be operating in the determination of step S104, the emission device starts emission (S106), and subsequently, the image obtaining unit 141 obtains the captured image from the image capturing device 12 (S108). Then, when the image obtaining unit 141 provides the captured image thus obtained to the analyzing unit 142 and the display control unit 146, the display control unit 146 causes the display device 11 to display the received captured image. On the other hand, the analyzing unit 142 determines whether the operation mode of the information processing apparatus 10 is the input mode of the assist mode in which a projected graphic image is generated according to operator's operation information (S110). In the present embodiment, the operation mode of the assist mode includes the input mode and the analytic mode.

When the operation mode is determined to be the input mode in step S110, the CPU 14 subsequently controls the operation of the information processing apparatus 10 to be in a state for waiting for operator's operation input (S112). Then, a determination is made, based on the operator's operation information, as to whether it is operation needing analysis of a captured image (S114). When it is determined to be operation needing analysis of the captured image in the determination of step S114, the generating unit 143 causes the analyzing unit 142 to analyze the captured image (S116). When it is determined not to be operation needing the analysis in the determination of step S114, the analytic processing of step S116 is omitted. On the other hand, when the operation mode is determined not to be the input mode but is determined to be the analytic mode in step S110, the operation of step S112 and step S114 is omitted, and the analyzing unit 142 analyzes the captured image in step S116.

Then, the generating unit 143 subsequently determines whether there is information to be presented to the subject based on at least one of the operation information and the analytic information (S118). When it is determined that there is no information to be presented in the determination of step S118, the CPU 14 returns back to step S108 to obtain the captured image. On the other hand, when it is determined that there is information to be presented to the subject in the determination of step S118, the generating unit 143 generates a graphic image to be projected onto the subject 20, based on at least one of the operation information and the analytic information (S120).

Then, the emission control unit 144 causes the emission device 13 to project the graphic image generated by the generating unit 142 in step S120 (S122). The subject 20 sees the projected graphic image, and changes a state to attain a state closer to the requested state. More specifically, the change of the state includes behaviors such as moving the position where the subject 20 stands, changing the facial expression, and changing the pose.

Then, the CPU 14 determines whether the operator has performed operation to take a picture, such as pressing the shutter button halfway down to adjust the focus (S124). When the result of the determination of step S124 indicates that the shutter button has not yet been pressed down, the CPU 14 returns back to step S108 again to obtain a captured image. On the other hand, when the result of the determination of step S124 indicates that the shutter button has been pressed down, the emission control unit 144 stops the projection of the graphic image (S126) to cause the image capturing device 12 to take a picture (S128). After a picture is taken in step S128, the CPU 14 returns back to the determination of step S102 to repeat the above operation until the assist mode is turned off.

In the example of FIG. 5, the projection of the graphic image is stopped upon detecting the shutter button being pressed down. However, the determination for stopping the projection of the graphic image is not limited to such example. For example, when the analytic result provided by the analyzing unit 142 indicates that the state of the subject 20 attains the requested state, the emission control unit 144 may stop the projection of the graphic image. Alternatively, the emission control unit 144 may stop the projection of the graphic image based on a stop operation performed by the operator or the subject.

Figure 16:
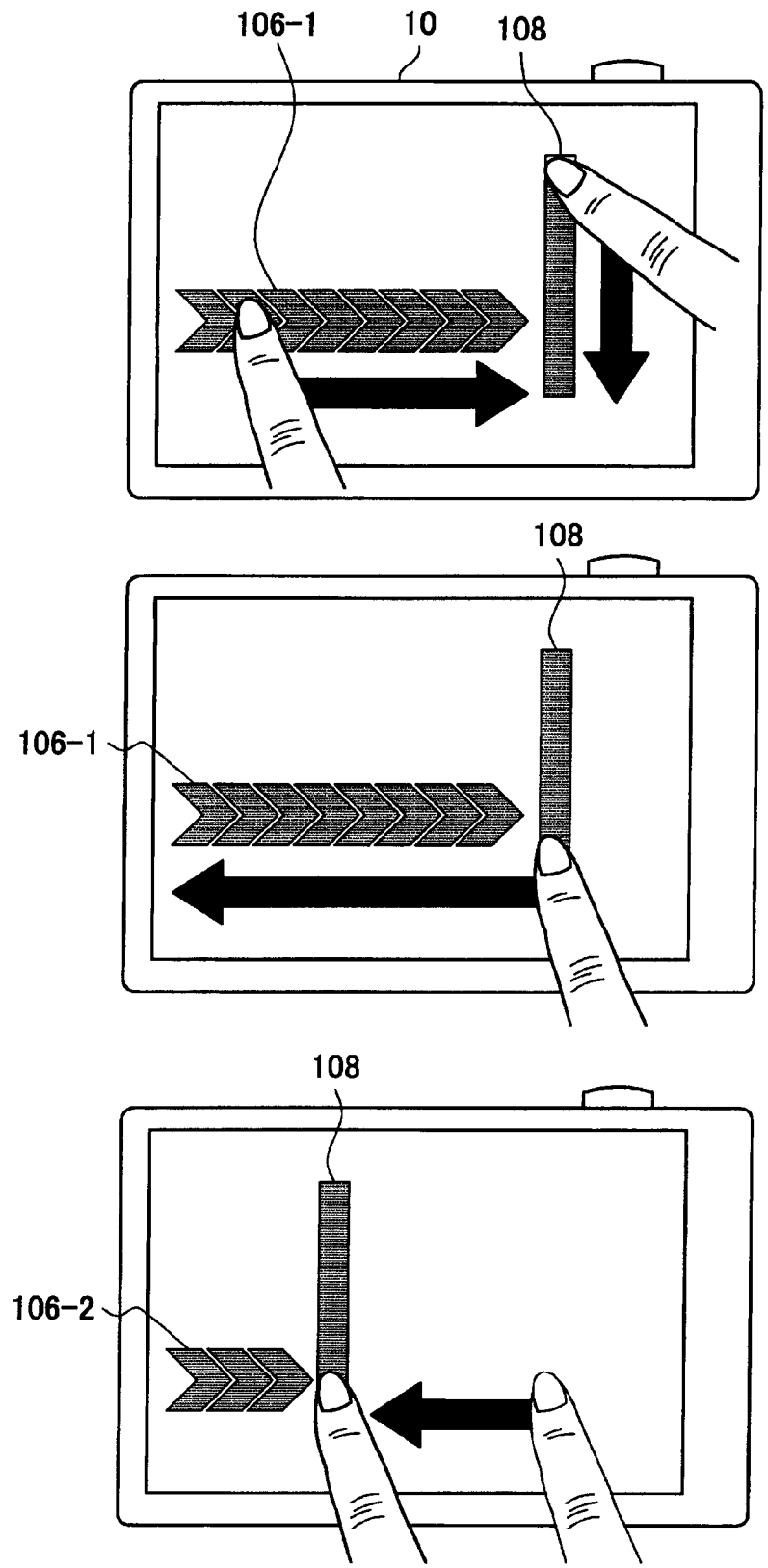
FIG. 16 is an explanatory diagram illustrating an example of generation of a corrected graphic image.
Figure 17:
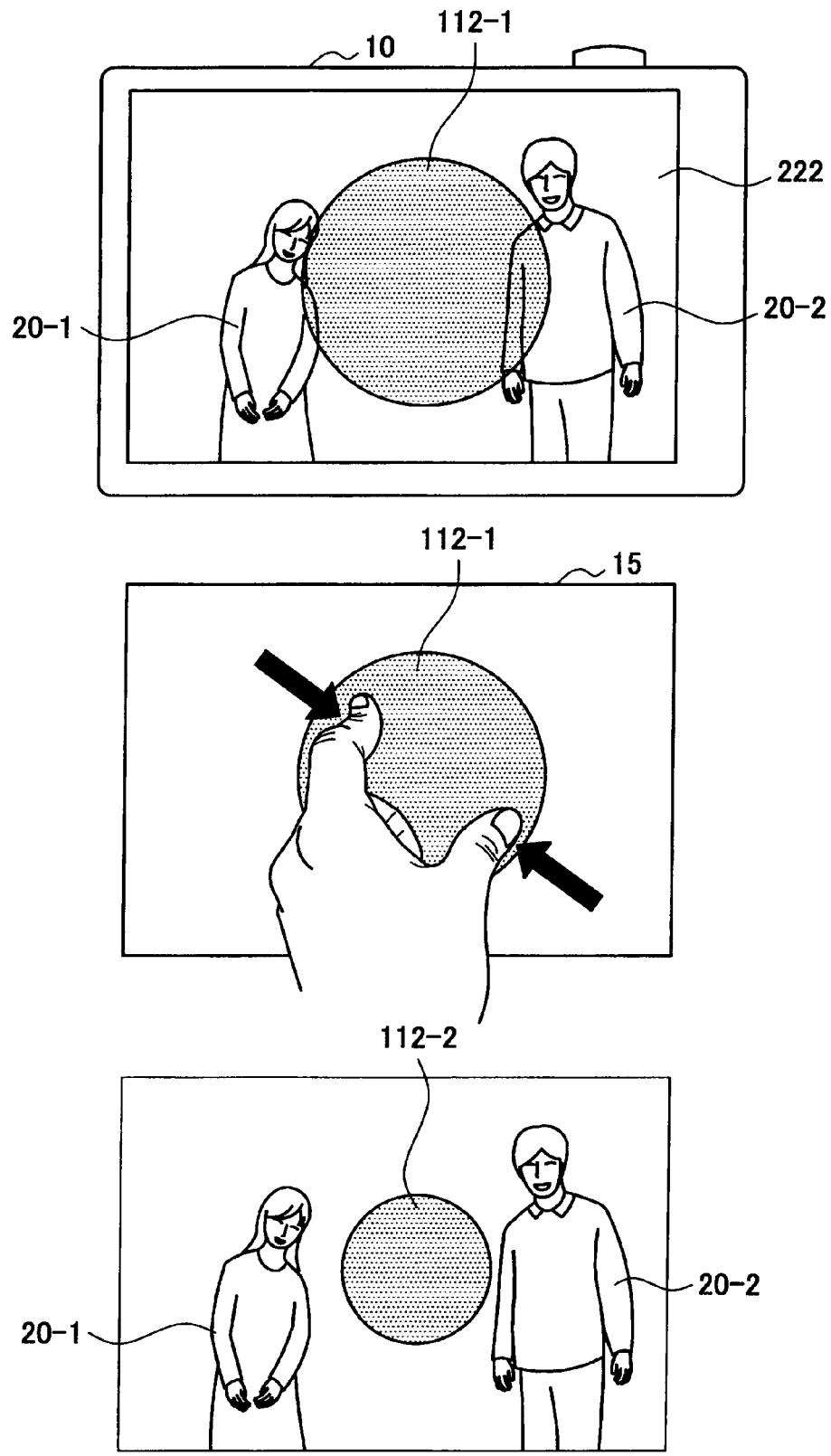
FIG. 17 is an explanatory diagram illustrating another example of generation of a corrected graphic image.

Operation of the information processing apparatus 10 has been explained hereinabove. Subsequently, specific examples of graphic images generated by the generating unit 143 of the information processing apparatus 10 will be explained with reference to FIGS. 6 to 17. The graphic images shown in FIGS. 6 to 15 are examples of graphic images generated according to operator's operation information. FIGS. 16 and 17 are examples of operation for correcting generated graphic images.

<4. Example of Generation of a Graphic Image According to User Operation>

The information processing apparatus 10 generates a graphic image according to operator's operation information. In this case, when the operation performed on the touch panel 15 and the graphic image generated at that moment are associated in advance, the graphic image can be generated from the operation information. This association can be defined in various manners. For example, examples of associations are shown below.

First, the example of FIG. 6 will be explained. Assume a case where the operator wants the subject 20 to move to the right side when the operator sees the captured image 204 displayed on the display screen of the display device 11. In this case, the operator can generate a graphic image to tell the subject 20 to move to the right side by moving the finger to the right side on the touch panel 15. At this occasion, the generating unit 143 generates a graphic image moving in the same direction as the direction in which the operator has moved the finger on the touch panel. Further, the generating unit 143 generates a graphic image so that the graphic image is projected onto the position indicated on the touch panel by the operator.

Figure 7:
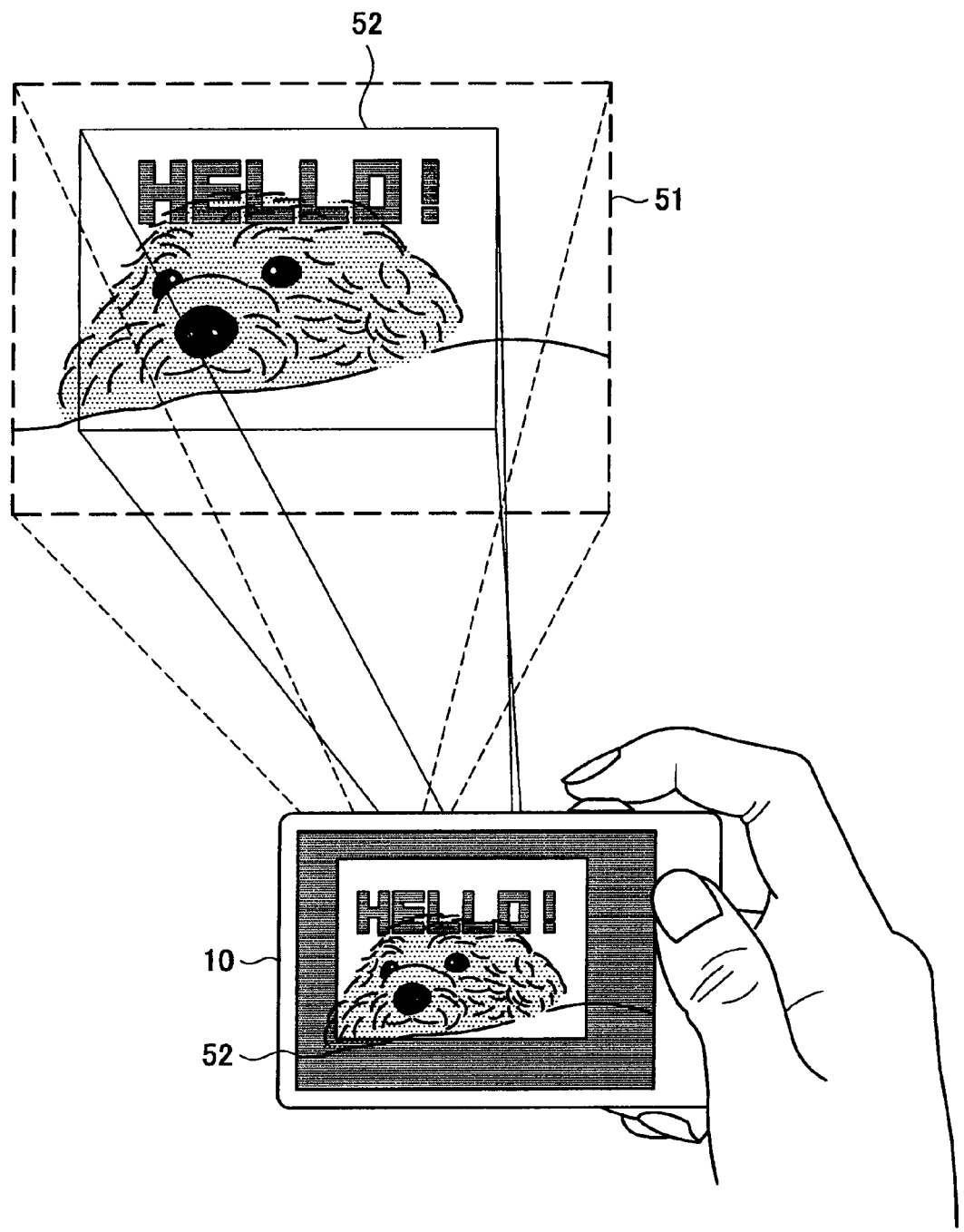
FIG. 7 is an explanatory diagram illustrating an example of display when a shooting region and an emission region are different.

When the display range on the touch panel and the emission range of the emission device 11 are synchronized and are identical at this occasion, the operator can project the graphic image onto the position indicated by the operator on the touch panel. When a display range 51 (which is also a shooting range in this case) is larger than an emission range 52 as shown in FIG. 7, the emission range 52 is shown on the screen of the display device 11, so that the operator can find an operable range on the screen.

Figure 6:
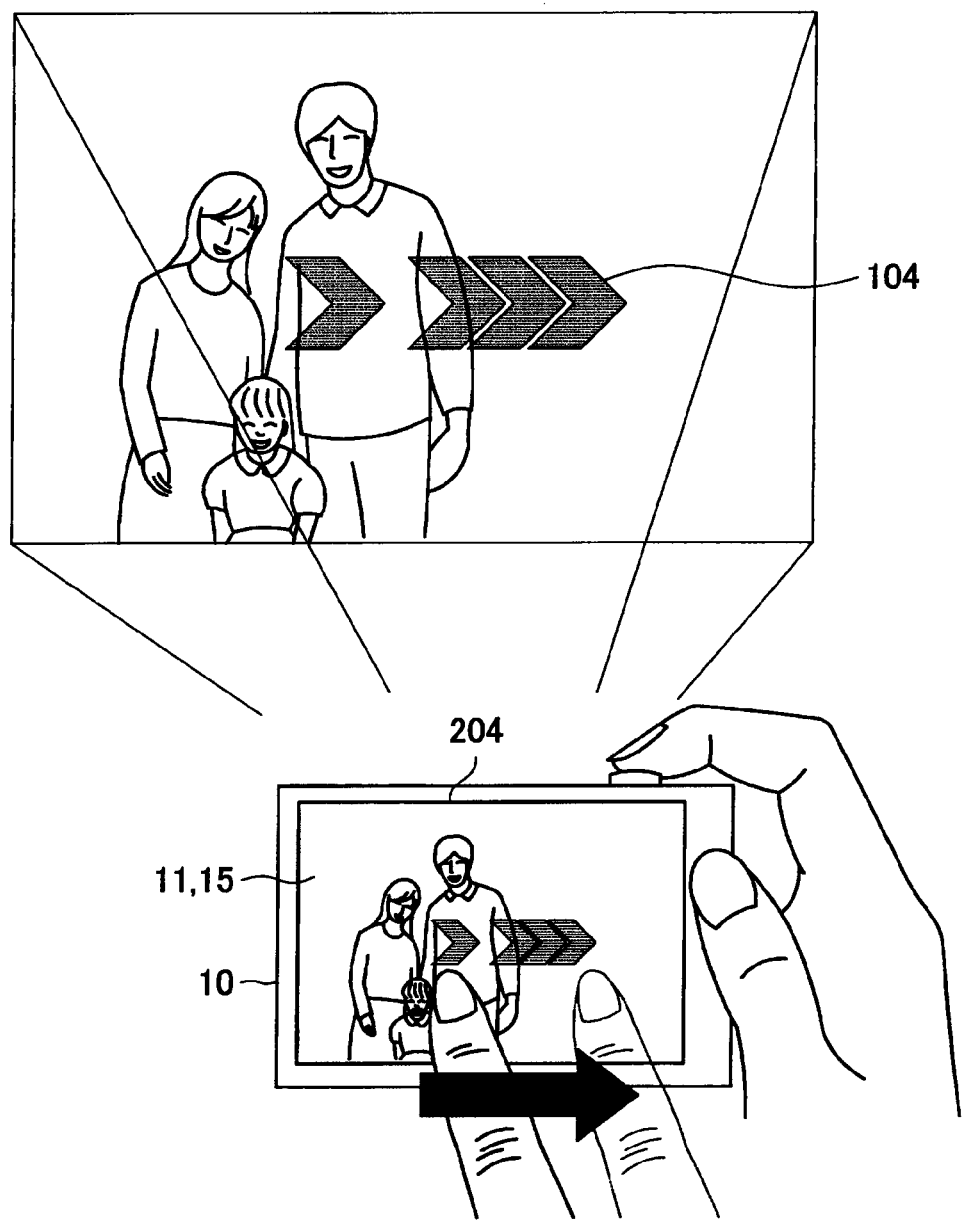
FIG. 6 is an explanatory diagram illustrating an example in which a graphic image is generated according to user operation.
Figure 8:
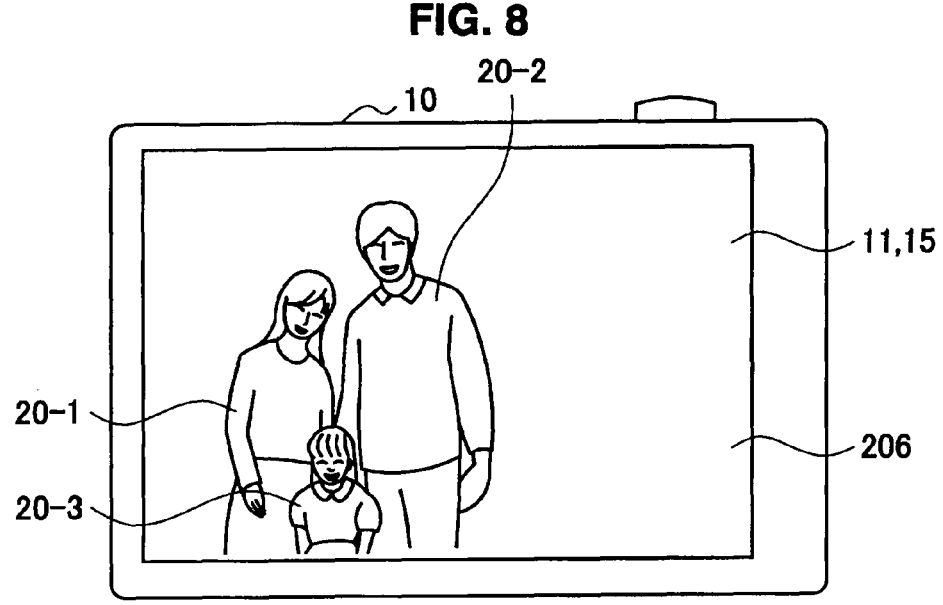
FIG. 8 is an explanatory diagram illustrating an example of user operation and a generated graphic image.
Figure 8:
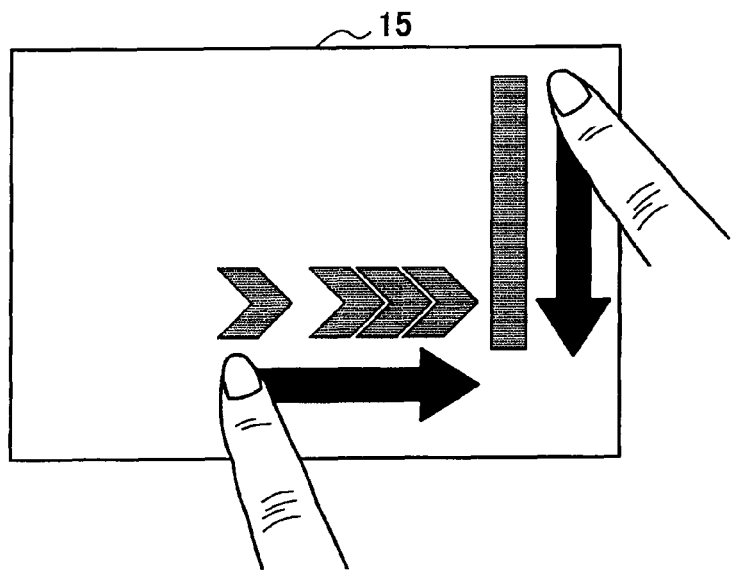
Figure 8:
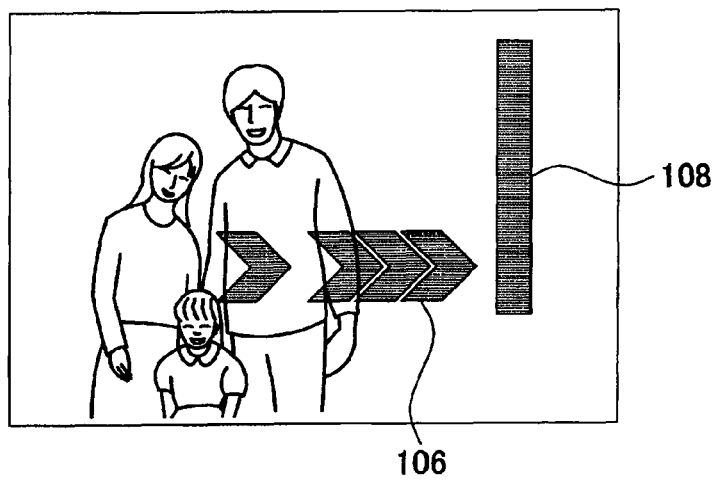

As shown in FIG. 8, the operator can also clearly indicate a destination to which the subject is expected to move in the same state as FIG. 6. On the touch panel 15, the operator moves a finger to the right, and thereafter the operator performs an operation for drawing a vertical line at the end point to which the finger is moved. Then, a graphic image 108 including a vertical bar is generated at the end of the graphic image 106 including the right-pointing arrow.

Figure 9:
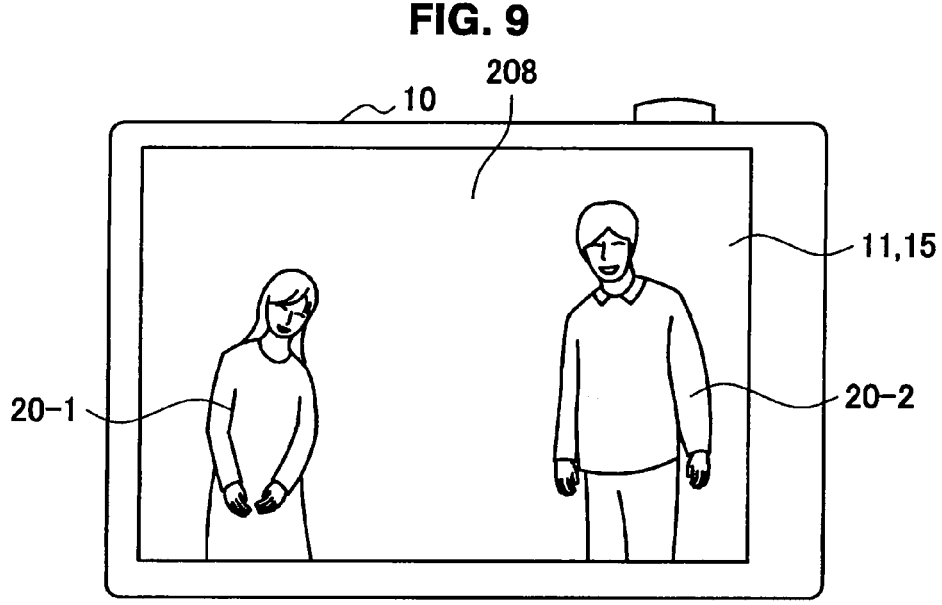
FIG. 9 is an explanatory diagram illustrating another example of user operation and a generated graphic image.
Figure 9:
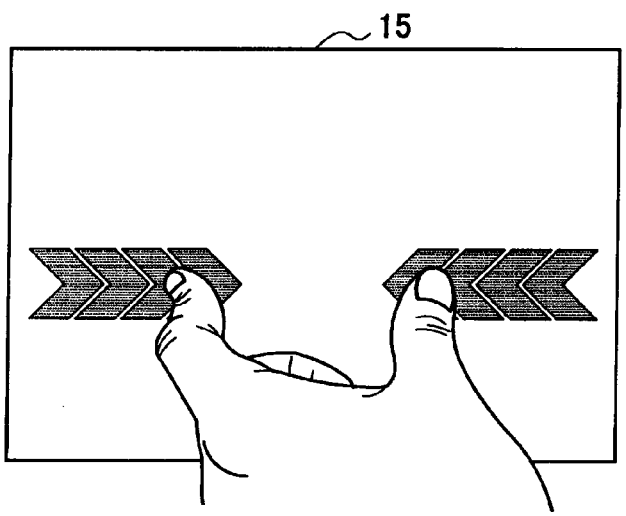
Figure 9:
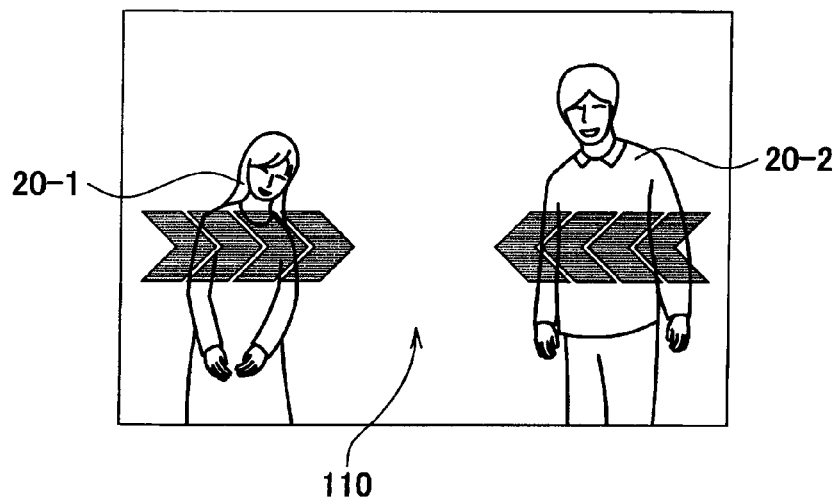
Figure 10:
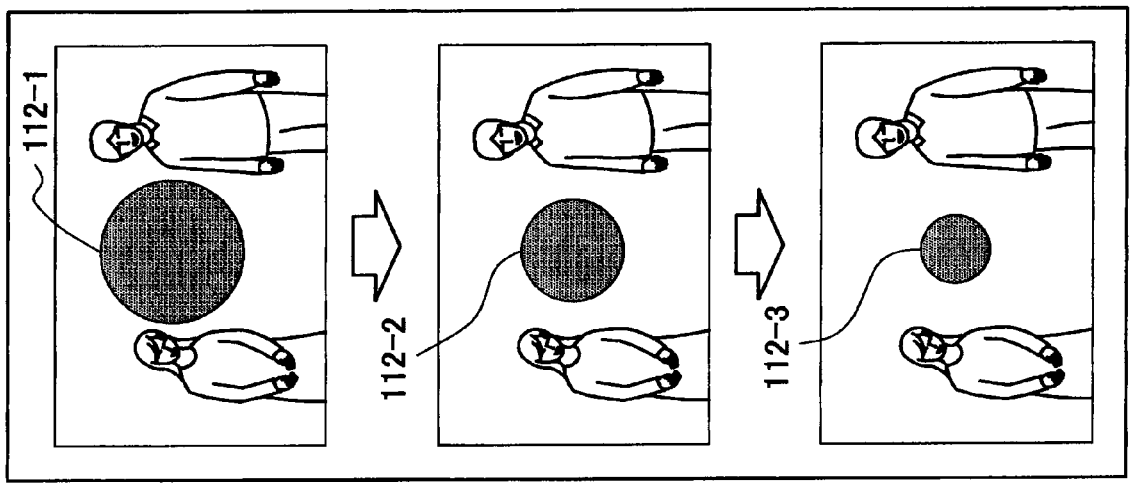
FIG. 10 is an explanatory diagram illustrating another example of user operation and a generated graphic image.
Figure 10:
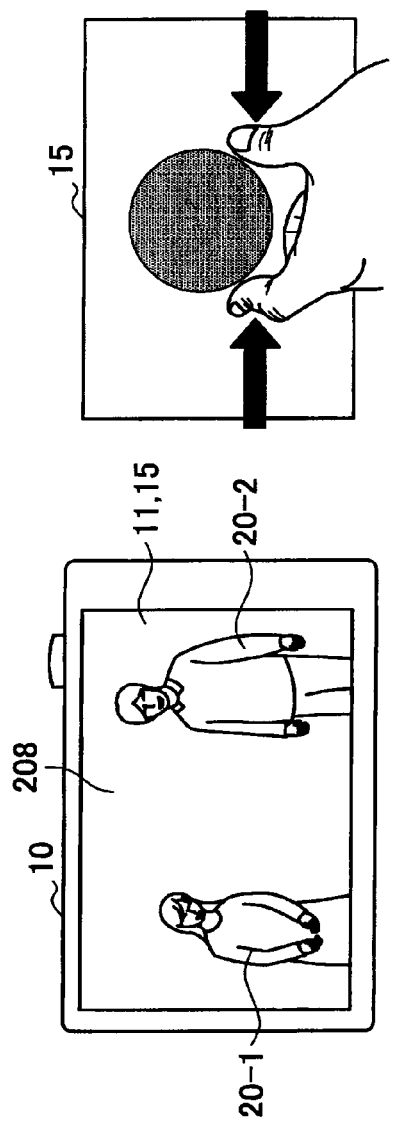

Another case will be considered. In this case, the operator sees a captured image 208 displayed on the display screen of the display device 11 as shown in FIG. 9, and the operator finds that a subject 20-1 and a subject 20-2 are standing too far from each other at the opposite ends of the screen. The operator wants the subject 20-1 and the subject 20-2 to move closer to each other. The operator performs an operation on the touch panel to move two fingers toward each other (pinch in operation), so that a graphic image including arrows pointing a position corresponding to a central point of the screen of the display device 11 is generated, and the generated graphic image can be projected onto the subject. The graphic image generated in this case is not limited to arrows pointing the position corresponding to the center of the screen. For example, as shown in FIG. 10, a graphic image 112 including a circle gradually shrinking over time may be projected onto the subject, so as to prompt the subjects to move to the center. At this occasion, after a graphic image 112-3 is displayed, a graphic image 112-1 may be displayed back again, so that these graphic images are repeatedly projected.

Figure 11:
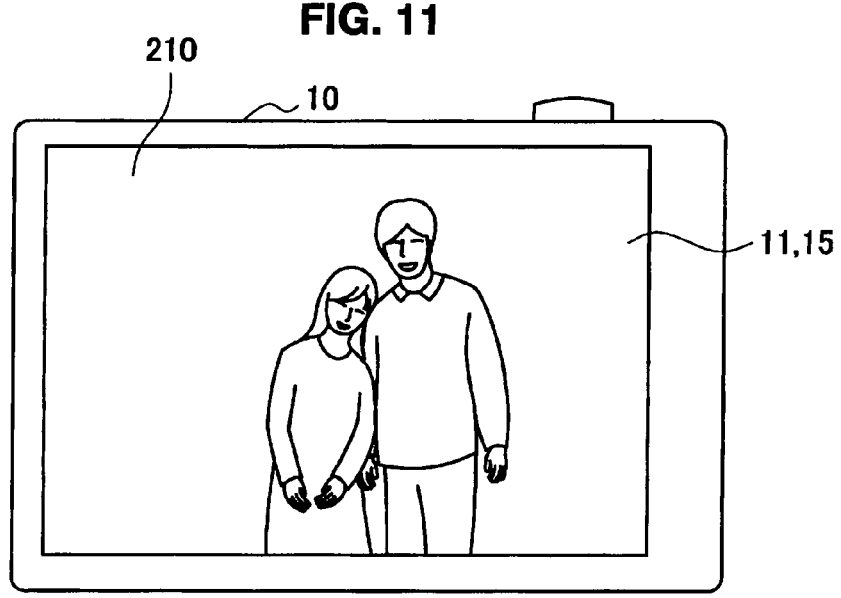
FIG. 11 is an explanatory diagram illustrating another example of user operation and a generated graphic image.
Figure 11:
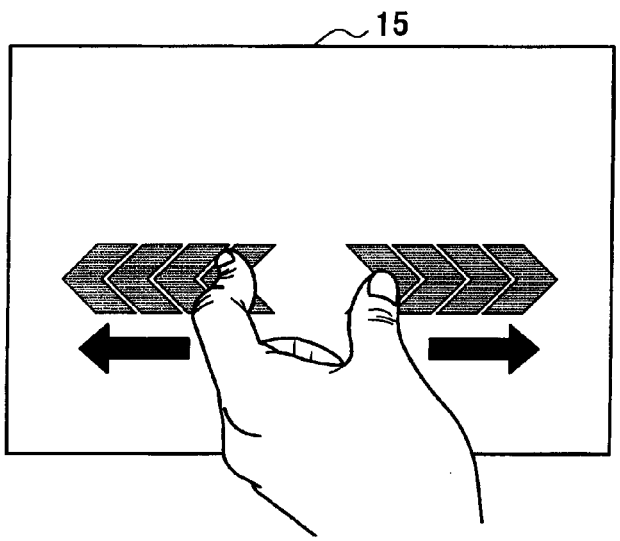
Figure 11:
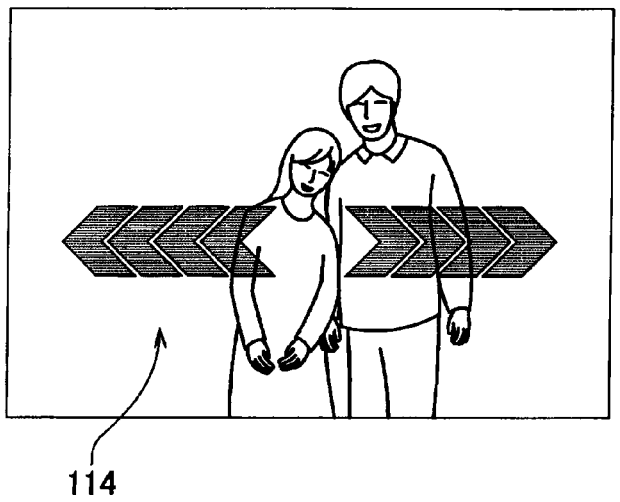

Another case will be considered. In contrast to the examples of FIGS. 9 and 10, the operator sees a captured image 210 displayed on the display screen of the display device 11 as shown in FIG. 11, and the operator wants the subjects 20 to move away from each other and stand at positions away from each other. In this case, the operator performs an operation on the touch panel 15 to move fingers away from each other (pinch out operation). Then, a graphic image including arrows pointing to the outside from the center of the screen of the display device 11 is generated, and the generated graphic image can be projected onto the subject. Alternatively, although not shown in the figure, a graphic image including a circle gradually enlarging over time may be projected onto the subject, like FIG. 10.

Figure 12:
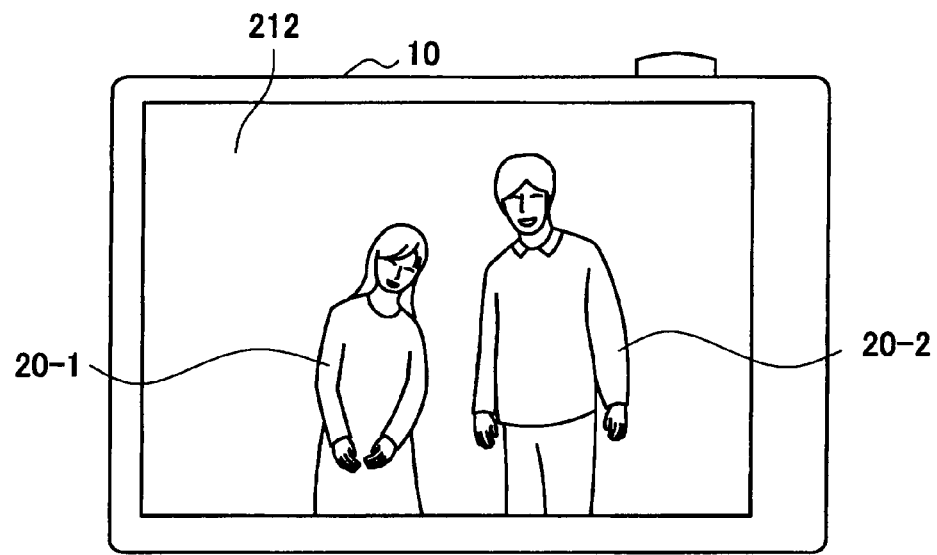
FIG. 12 is an explanatory diagram illustrating another example of user operation and a generated graphic image.
Figure 12:
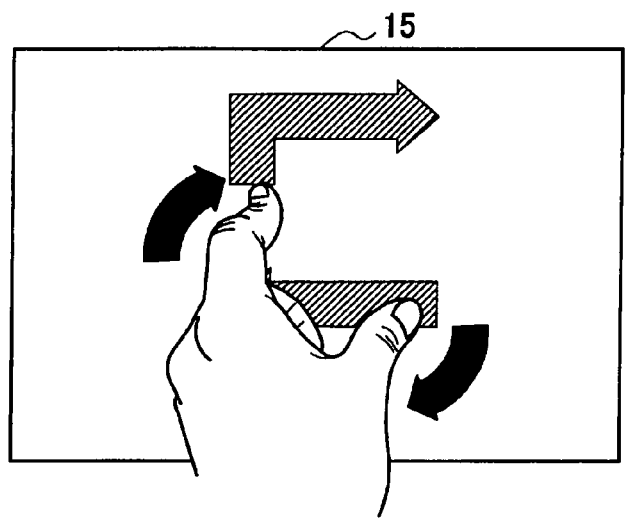
Figure 12:
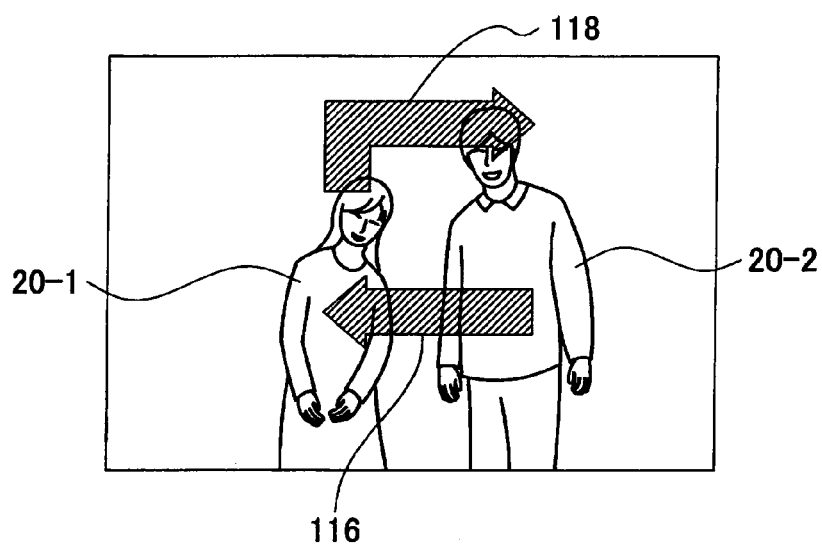

Another case will be considered. In this case, the operator wants the subject 20-1 and the subject 20-2 to switch the standing positions. In this case, as shown in FIG. 12, the operator points the subject 20-1 and the subject 20-2 on the touch panel 15 and performs an operation for switching the finger positions. Then, a graphic image 118 prompting the subject 20-1 to move to the right side is projected onto the subject 20-1 standing on the left side when seen from the operator. A graphic image 116 prompting the subject 20-2 to move to the left side is projected onto the subject 20-2 standing on the right side when seen from the operator.

Figure 13:
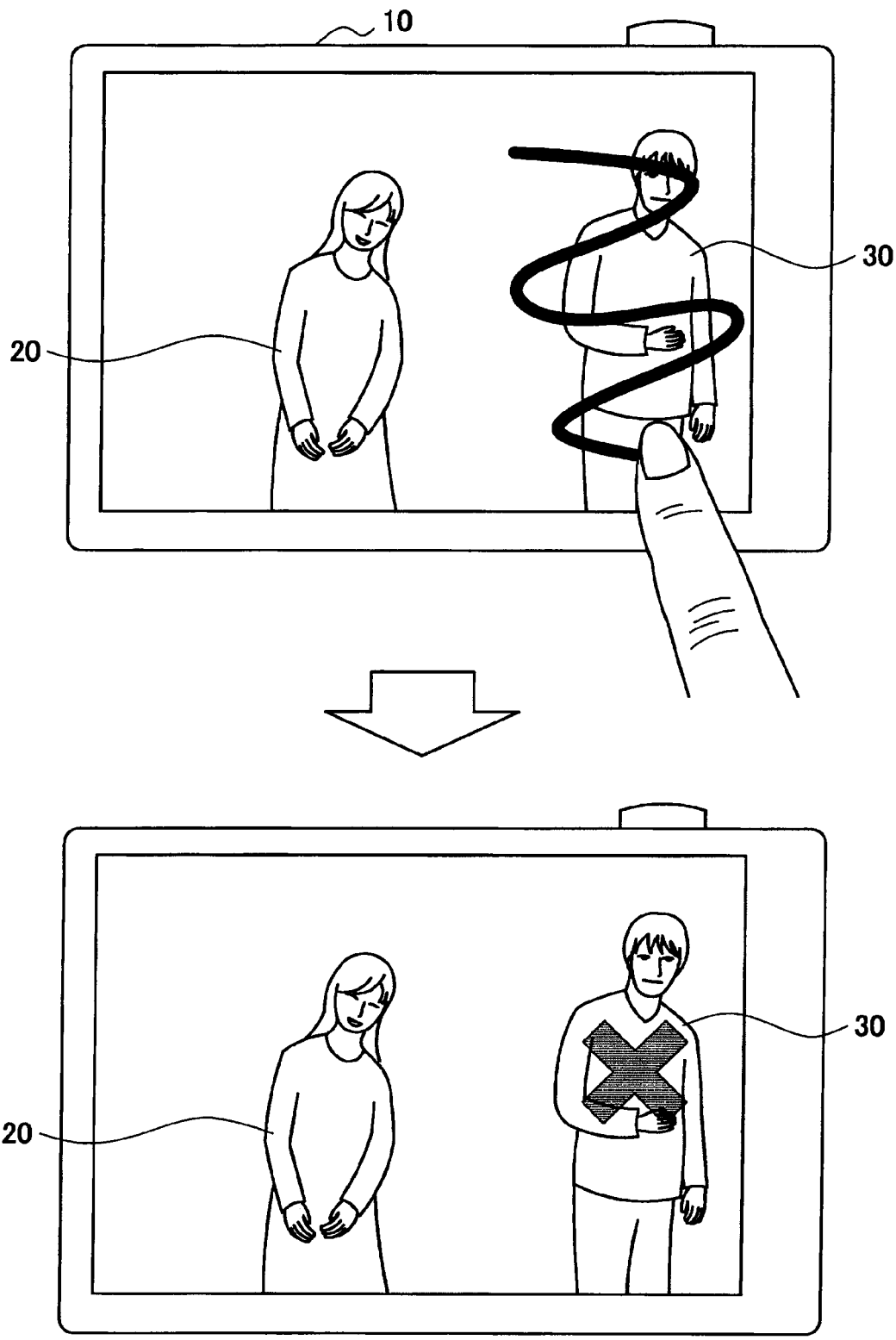
FIG. 13 is an explanatory diagram illustrating another example of user operation and a generated graphic image.

Another case will be considered. In this case, the operator sees a captured image 214 displayed on the display screen of the display device 11 as shown in FIG. 13, and the operator finds a stranger 30 appearing in the screen in addition to a subject 20. In this case, the operator performs an operation for scrubbing the stranger 30 with an eraser in the captured image 214 displayed on the display screen. Then, a graphic image 120 is projected onto the stranger 30 so as to tell the stranger to move away.

Figure 14:
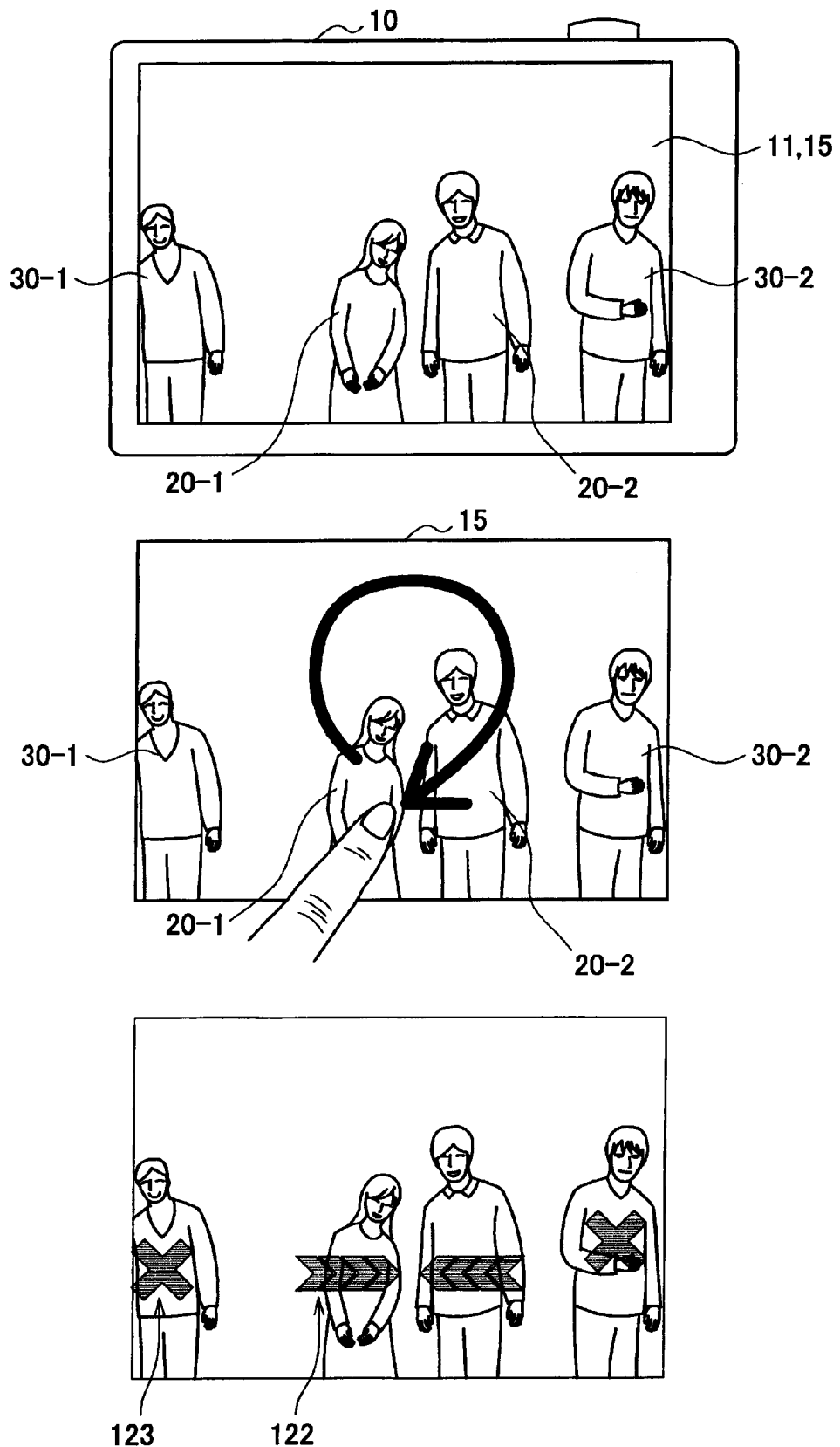
FIG. 14 is an explanatory diagram illustrating another example of user operation and a generated graphic image.

Another case will be considered. In this case, the operator sees a captured image 216 displayed on the display screen of the display device 11 as shown in FIG. 14, and the operator finds strangers 30 appearing in the screen in addition to a subject 20-1 and a subject 20-2. In this case, the operator performs an operation on the touch panel 15 to make a circle around the faces of the subject 20-1 and the subject 20-2 with a finger. Then, a graphic image 122 is projected onto the subject 20-1 and the subject 20-2 to prompt them to move closer to each other. A graphic image 123 is projected onto a stranger 30-1 and a stranger 30-2 to tell them to move away. In this case, the operator performs the operation for making the circle around the faces of the subjects 20. However, the operation is not limited thereto. For example, the operator may specify subjects by touching the facial portions of the subjects 20 on the touch panel.

Figure 15:
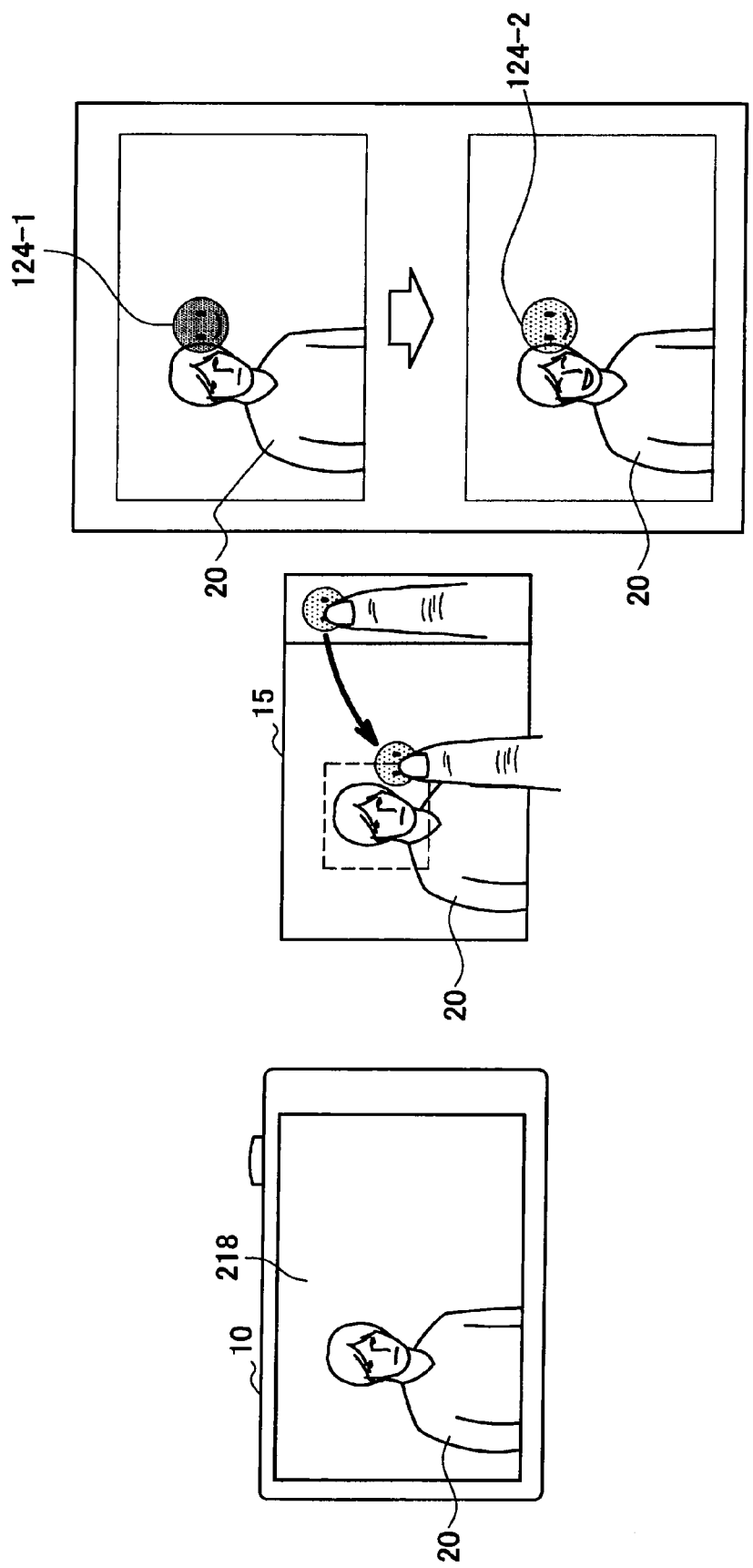
FIG. 15 is an explanatory diagram illustrating another example of user operation and a generated graphic image.

Alternatively, as shown in FIG. 15, the operator may perform input by selecting a graphic image prepared in advance with a tool box. For example, when the operator wants to change the facial expression of a subject 20, more specifically, when the operator wants to shoot a picture of the subject 20 who is smiling, the operator touches an icon 402 in the tool box displayed on the display screen of the display device 11, and drags-and-drops the icon 402 to a position close to the face of the subject 20, so that a graphic image 124 is projected close to the face of the subject 20. At this occasion, the graphic image 124 may be projected in a color according to the facial expression of the subject 20. For example, when the subject 20 is not so much smiling, the image is projected in a colder color. When the subject 20 is more like smiling, the image may be projected in a warmer color. The analyzing unit 142 analyzes a captured image to perform this kind of color adjustment.

Further, graphic images prepared in this tool box in advance may be combined to generate a graphic image to be projected. Alternatively, an interface may be prepared to allow the operator to make graphic image templates in the tool box.

The examples of graphic images generated based on the user's operation information have been explained hereinabove. Subsequently, operation for adjusting a generated graphic image will be explained. For example, FIG. 16 is an example for adjusting the graphic image 106 and the graphic image 108 generated in the example of FIG. 8. For example, as shown in the left figure, the graphic image 106 and the graphic image 108 are generated according to operation performed by a user on the touch panel 15. The operator touches the graphic image 108 and drags-and-drops the graphic image 108 to the left side. Then, the length of the graphic image 106 is changed according to the position at which the graphic image 108 is dropped. It should be noted that this adjustment operation may be performed after the operator switches the mode to an adjustment mode, for example. Alternatively, it may be possible to automatically distinguish, based on the position of the finger of the operator, whether the given operation is an adjustment operation of an already generated graphic image, or an input operation for generating a new graphic image.

For example, FIG. 17 is an example for adjusting the graphic image 112 generated in the example of FIG. 10. For example, as shown in the figure in the middle, the operator performs an operation for pinching a graphic image 112-1 displayed on the captured image 222 displayed on the display screen of the display device 11 to adjust the size of the graphic image 112-1. For example, FIG. 17 shows operation for reducing the size of a circle. Then, a corrected graphic image 112-2 whose size has been adjusted according to operation performed by the operator is projected onto the subject 20.

<5. Example of Automatic Generation of a Graphic Image According to an Analytic Result>

The examples for generating the graphic images based on user's operation information have been hereinabove explained. Subsequently, an example of automatic generation of a graphic image based on an analytic result of a captured image provided by the analyzing unit 142 will be explained.

Figure 18:
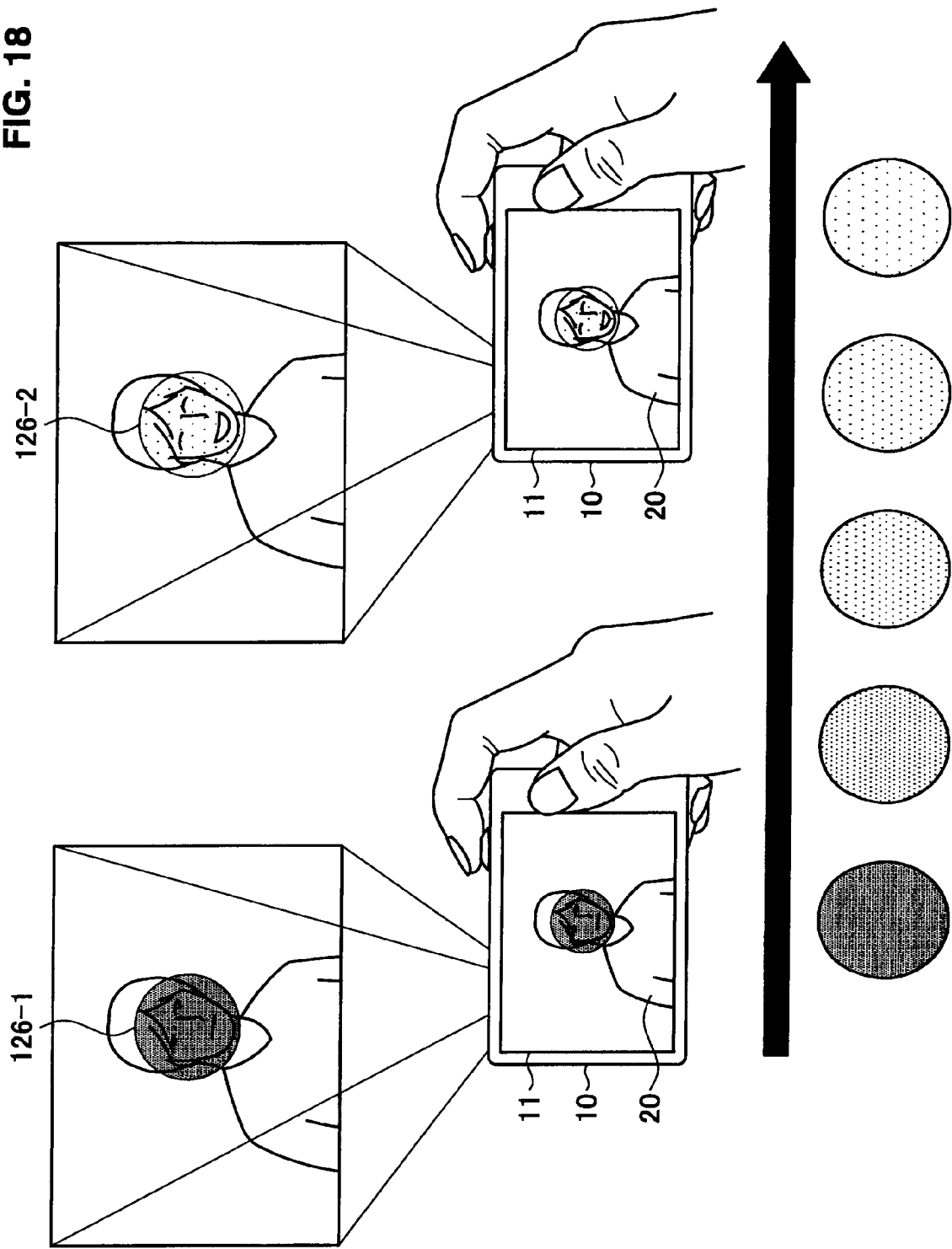
FIG. 18 is an explanatory diagram illustrating an example of a graphic image generated based on an analytic result.

FIG. 18 is an example for analyzing the facial expression of a subject 20. When the subject 20 is not smiling, a graphic image 126-1 is projected in a dark color. When the subject 20 is smiling, a graphic image 126-2 may be projected in a brighter color. At this occasion, the analyzing unit 142 may use available facial recognition techniques and smiling face detection techniques.

Figure 19:
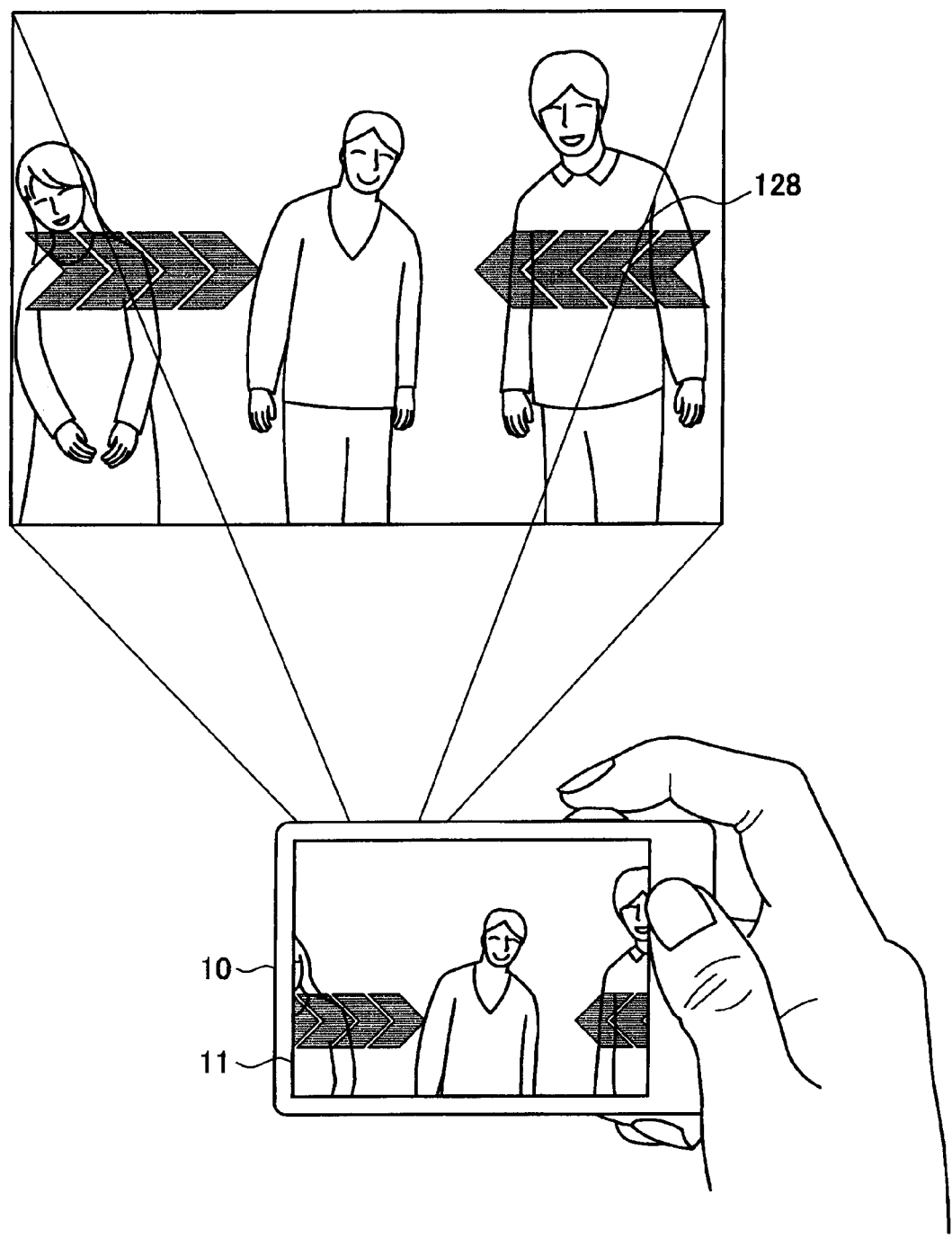
FIG. 19 is an explanatory diagram illustrating another example of a graphic image generated based on an analytic result.

FIG. 19 is an example for detecting a frame-out of a subject. When there is a possibility that the subject 20 goes out of a shooting region, a graphic image showing a moving direction is projected onto the subject 20.

Figure 20:
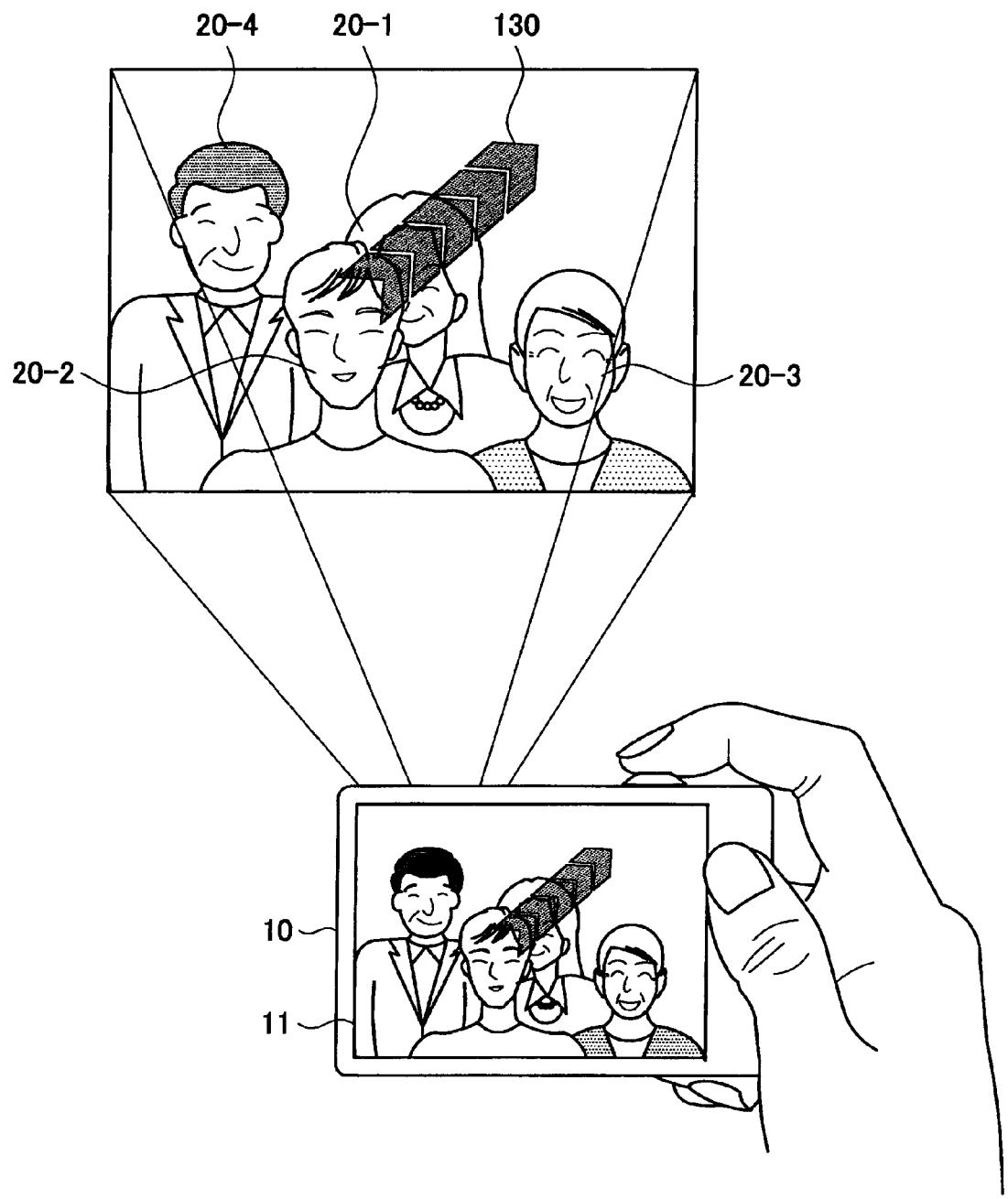
FIG. 20 is an explanatory diagram illustrating another example of a graphic image generated based on an analytic result.

FIG. 20 is an example for detecting a face behind someone else. When the face of the subject 20-1 is behind another subject 20-2 and cannot be seen, a graphic image 130 is projected onto the subject 20-1 to prompt the subject 20-1 to move the position of the face in such direction that the face of the subject 20-1 is not behind the other subjects 20-2, 20-3, and 20-4. At this occasion, the analyzing unit 142 detects the face of the subject 20 according to an available facial recognition technique, and when a detected face cannot be seen, the analyzing unit 142 determines that the face is behind someone else.

Figure 21:
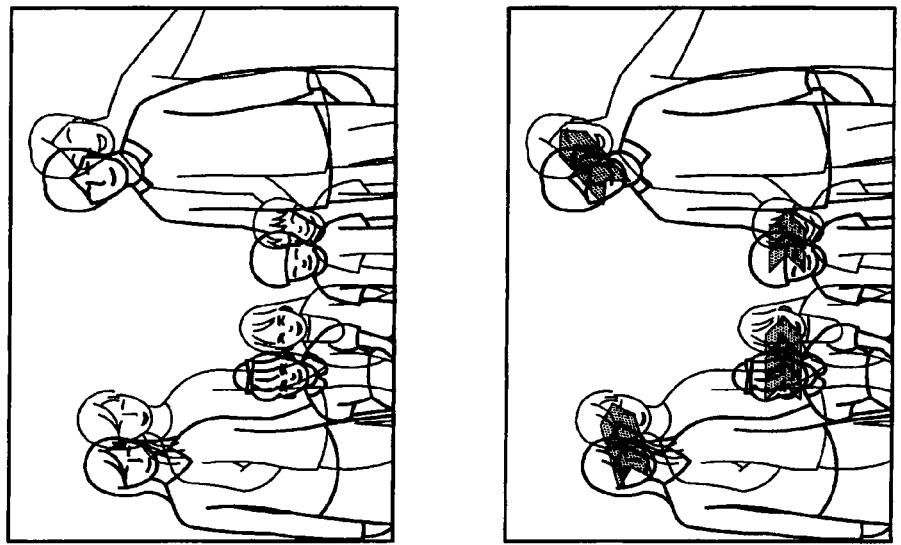
FIG. 21 is an explanatory diagram illustrating another example of a graphic image generated based on an analytic result.
Figure 21:
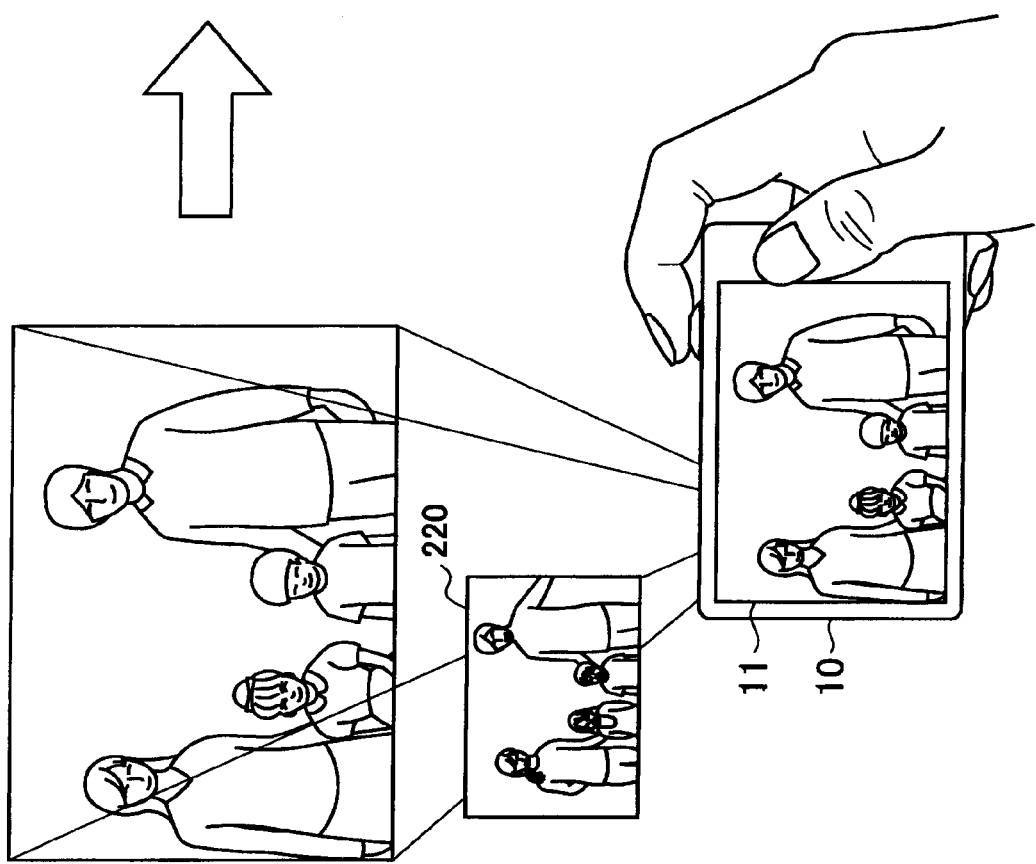

FIG. 21 is an example for projecting a picture 220 taken in the past onto a subject, so that the subject is prompted to move in view of the composition information as reference. In this case, the analyzing unit 142 may detect a difference between the picture 220 taken in the past and the current position of the subject, and the generating unit 143 may generate a graphic image including an arrow indicating such direction that the difference detected by the analyzing unit 142 is eliminated.

When a difference from a desired state can be recognized from the analytic result provided by the analyzing unit 142, this information may be used to determine stopping of projection of the graphic image. In the flowchart of FIG. 5, the emission control unit 144 stops projection of the graphic image when the emission control unit 144 detects that the operator presses the shutter button halfway down. However, the present invention is not limited thereto. For example, the projection of the graphic image may be stopped when the analytic information indicates that there is no longer any difference from the desired state or the difference is very small. For example, in the example of FIG. 18, when the subject 20 is determined to be smiling, the projection of the graphic image may be stopped. In the example of FIG. 20, when the faces of all the persons are correctly recognized, the projection of the graphic image may be stopped.

It should be understood by those skilled in the art that various modifications, combinations, sub-combinations and alterations may occur depending on design requirements and other factors insofar as they are within the scope of the appended claims or the equivalents thereof.

For example, in the above embodiment, the information processing apparatus 10 is an apparatus including the image capturing device 12 and the emission device 13. However, the present invention is not limited thereto. For example, the information processing apparatus 10 may obtain a captured image from a separate image capturing device and generate a graphic image to be projected, and may thereafter output the graphic image to be projected to the separate emission device.

In this specification, regarding the steps described in the flowcharts, it is to be understood that the processings performed in time series according to the described order are not necessarily processed in time series, and include processings executed in parallel or separately. Even in the steps processed in time series, it is to be understood that the order may be changed as necessary in some cases.

The present application contains subject matter related to that disclosed in Japanese Priority Patent Application JP 2010-057817 filed in the Japan Patent Office on Mar. 15, 2010, the entire content of which is hereby incorporated by reference.

What is claimed is:

1. An information processing apparatus comprising:
   an image obtaining unit for obtaining a captured image;
   a generating unit for generating a graphic image for prompting a subject within the captured image obtained by the image obtaining unit to change a state; and
   an emission control unit for controlling emission of the graphic image generated by the generating unit onto the subject,
   wherein the emission control unit controls the graphic image to be emitted onto the subject while the subject remains positioned in a state and location as shown in the captured image, and the graphic image is configured to visually instruct the subject as to how the subject should change the state or location of positioning.

2. The information processing apparatus according to claim 1, further comprising:
   an analyzing unit for analyzing the captured image obtained by the image obtaining unit,
   wherein the generating unit generates the graphic image based on an analytic result provided by the analyzing unit.

3. The information processing apparatus according to claim 2, further comprising:
   an operation information obtaining unit for obtaining information about operation performed by an operator,
   wherein the generating unit generates the graphic image based on the operation information.

4. The information processing apparatus according to claim 3,
   wherein the generating unit generates a corrected graphic image based on information about operation performed on the generated graphic image, and
   the emission control unit controls emission of the corrected graphic image onto the subject.

5. The information processing apparatus according to claim 2,
   wherein the analyzing unit outputs the analytic result including difference information representing a difference between a desired state and a state of the subject in the captured image, and
   the generating unit generates, based on the difference information, a graphic image for prompting the subject to change the state so that the subject attains a state closer to the desired state.

6. The information processing apparatus according to claim 5, wherein the emission control unit stops emission of the graphic image when the difference information is determined to be equal to or less than a threshold value.

7. The information processing apparatus according to claim 1, wherein the emission control unit controls the graphic image to stop being emitted when the state or location of positioning of the subject attains a requested state.

8. The information processing apparatus according to claim 1, wherein the graphic image is a dynamic image.

9. The information processing apparatus according to claim 1, wherein the generating unit updates the graphic image as the image obtaining unit obtains a subsequent captured image.

10. The information processing apparatus according to claim 3, wherein the operation performed by the operator indicates an instruction for the subject to change the state or location of positioning.

11. An information processing method realized by causing calculation processing means of an information processing apparatus to execute a predetermined processing procedure, the processing procedure comprising the steps of:

obtaining a captured image;

generating a graphic image for prompting a subject within the captured image obtained to change a state; and controlling emission of the graphic image onto the subject, wherein the graphic image is controlled to be emitted onto the subject while the subject remains positioned in a state and location as shown in the captured image, and the graphic image is configured to visually instruct the subject as to how the subject should change the state or location of positioning.

12. A non-transitory computer-readable medium having embodied thereon a program, which when executed by a computer, causes the computer to perform a method, the method comprising:

obtaining a captured image;

generating a graphic image for prompting a subject within the captured image to change a state; and controlling emission of the graphic image onto the subject, wherein the graphic image is controlled to be emitted onto the subject while the subject remains positioned in a state and location as shown in the captured image, and the graphic image is configured to visually instruct the subject as to how the subject should change the state or location of positioning.

* * * * *